(12) United States Patent
Yekani Fard et al.

(10) Patent No.: US 12,399,095 B2
(45) Date of Patent: Aug. 26, 2025

(54) REINFORCED MIXED-MODE BENDING APPARATUS

(71) Applicants: Masoud Yekani Fard, Tempe, AZ (US); Christian Bonney, San Antonio, TX (US)

(72) Inventors: Masoud Yekani Fard, Tempe, AZ (US); Christian Bonney, San Antonio, TX (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 342 days.

(21) Appl. No.: 17/961,355

(22) Filed: Oct. 6, 2022

(65) Prior Publication Data

US 2023/0110699 A1    Apr. 13, 2023

Related U.S. Application Data

(60) Provisional application No. 63/253,834, filed on Oct. 8, 2021.

(51) Int. Cl.
*G01N 3/20* (2006.01)

(52) U.S. Cl.
CPC ....... *G01N 3/20* (2013.01); *G01N 2203/0023* (2013.01); *G01N 2203/0067* (2013.01); *G01N 2203/026* (2013.01)

(58) Field of Classification Search
CPC ............. G01N 3/20; G01N 2203/0023; G01N 2203/0067; G01N 2203/026
See application file for complete search history.

(56) References Cited

U.S. PATENT DOCUMENTS 4,926,694 A * 5/1990 Crews, Jr. ............... G01N 3/20
73/794

OTHER PUBLICATIONS

Reeder et al., "Redesign of the Mixed-Mode Bending Delamination Test to Reduce Nonlinear Effects", J. Compos. Technol. Res.. Mar. 1992, 14(1): 12-19, <https://doi.org/10.1520/CTR10078J> (Year: 1992).*
Fard et al., "Reinforced Mixed Mode Bending Fixture for Improved Characterization", IMECE2021, Nov. 1-5, 2021, <https://doi.org/10.1115/IMECE2021-70604> (Year: 2021).*
Arcan, M., Hashin, Z., Voloshin, A., "A Method to produce uniform plane-stress states with applications to fiber-reinforced materials," Experimental Mechanics, 1978, 28, 141-146. doi.org/10.1007/BF02324146.

(Continued)

*Primary Examiner* — Jonathan M Dunlap
(74) *Attorney, Agent, or Firm* — FULLER IP LAW LLC; Rodney J. Fuller

(57) ABSTRACT

A reinforced mixed-mode bending apparatus (RMMBA) is provided. The RMMBA is a new fixture design for testing fracture and characterizing delamination in layered materials under combined mode I (pulling/tension) and mode II (in-plane shear) loads. The purpose of this design is to provide a much less compliant fixture for conducting the Mixed Mode Bending (MMB) test. Embodiments described herein improve the accuracy of the MMB test and reduce the complexity of post-processing the collected data.

20 Claims, 17 Drawing Sheets

(56) References Cited

OTHER PUBLICATIONS

ASTM (American Society for Testing and Materials), "Standards Test Method for Mixed Mode I-Mode II Interlaminar Fracture Toughness of Unidirectional Fiber Reinforced Polymer Matrix Composites," 2001. ASTM D6671-01. West Conshohocken, PA: ASTM.

ASTM (American Society for Testing and Materials), "Standards Test Method for Mixed Mode I-Mode II Interlaminar Fracture Toughness of Unidirectional Fiber Reinforced Polymer Matrix Composites," 2019. ASTM D6671/D6671M-19. West Conshohocken, PA: ASTM.

Benzeggagh, M., Kenane, M., "Measurement of mixed-mode delamination fracture toughness of unidirectional glass/epoxy composites with mixed-mode bending apparatus". Composites Science and Technology, 1996, 56(4), 439-449. 403 doi:10.1016/0266-3538(96)00005-x.

Bonhomme, J., Arguelles, A., Vina, J., Vina, I., "Fractography and failure mechanisms in static mode I and mode II delamination testing of unidirectional carbon reinforced composites," Polymer Testing, 2009, 28(6), 612-617. doi:10.1016/j.polymertesting.2009.05.003.

Bradley, W.L. Cohen, R.N., "Matrix deformation and fracture in graphite-reinforced epoxies," in Delamination and Debonding of Materials, ASTM STP 876, W. S. Johnson, Ed., American Society for Testing and Materials, Philadelphia, 1985, 389-410. doi.org/10.1520/STP36316S.

Cater, C.R., Xiao, X., Goldberg, R.K., Kohlman, L.W., "Single ply and multi-ply braided composite response predictions using modified subcell approach," ASCE Journal of Aerospace Engineering, 2015, 28(5), 04014117. doi:0.1061/(ASCE)AS.1943-5525.0000445.

Chen, J., Sernow, R., Schulz, E., Hinrichsen, G., "A modification of the mixed-mode bending test apparatus". Composites Part A: Applied Science and Manufacturing, 1999, 30(7), 871-877. doi:10.1016/s1359-835x(98)00193-6.

Crews, J.H., Reeder, J.R., "A mixed-mode bending apparatus for delamination testing," NASA Technical Memorandum 100662, Langley Research Center, Hampton, Virginia, U.S.A.. 1988.

Daneshjoo, Z., Amaral, L., Alderliesten, R., Shokrieh, M., Fakoor, M., "Development of a physics-based theory for mixed mode I/II delamination onset in orthotropic laminates," Theoretical and Applied Fracture Mechanics, 2019, 103, 102303. doi:10.1016/j.tafmec.2019.102303.doi:10.1016/j.tafmec.2019.102303.

Ducept, F., Davies, P., Gamby, D., "An experimental study to validate tests used to determine mixed mode failure criteria of glass/epoxy composites," Composites Part A: Applied Science and Manufacturing, 28(8), 1997, 719-729. doi:10.1016/s1359-835x(97)00012-2.

Hashemi, S., Kinloch, A.J., Williams, J.G., "Interlaminar fracture of composite materials," in 6th ICCM & 2nd ECCM Conference Proceedings London, 1987, 3, 3.254-3.264.

Kolluri, M., Thissen, M.H., Hoefnagels, J.P., Dommelen, J.A., Geers, M.G., "Advanced miniature mixed mode bending setup for in-situ interface delamination characterization". EuroSimE 2008—International Conference on Thermal, Mechanical and Multi-Physics Simulation and Experiments in Microelectronics and Micro-Systems, 2008. doi:10.1109/esime.2008.4525090.

Littell, J.D., Binienda, W.K., Roberts, G.D., Goldberg, R.K., "Characterization of damage in triaxial braided composites under tensile loading," ASCE Journal of Aerospace Engineering, 2009, 22(3), 270-279. doi: 10.1061/ASCE_0893-1321_2009_22:3_270.

Mathews, M., Swanson, S., "Characterization of the interlaminar fracture toughness of a laminated carbon/epoxy composite," Composites Science and Technology, 2007, 67(7-8), 1489-1498. doi:10.1016/j.compscitech.2006.07.035.

O'Brien, T.K., Johnston, N.J., Raju, I.S., Morris, D.H., Simmonds, R.A., "Comparisons of various configurations of the edge delamination test for Interlaminar fracture toughness," Toughened Composites, ASTM STP 937, N. J. Johnston, Ed., American Society for Testing Materials, Philadelphia, 1987, 199-221.

Pflugler, N., Reuther, G.M., Goroll, M., Udiljak, D., Pufall, R., Wunderle, B., "Experimental determination of critical adhesion energies with the Advanced Button Shear test," Microelectronics Reliability, 2019, 99, 177-185. doi:10.1016/j.microrel.2019.06.001.

Reeder, J.R., Crews, J.H., "Mixed-mode bending method for delamination testing," AIAA Journal, 1990, 28(7), 1270-1276. doi:10.2514/3.25204.

Reeder, J.R., "An evaluation of mixed-mode delamination failure criteria," NASA Technical Memorandum 104210, Langley Research Center, Hampton, VA, 1992b, 23665-5225, U.S.A.

Reeder, J.R., "Refinements to the mixed-mode bending test for delamination toughness," NASA Langley Research Center, Hampton, VA, 2000, 23681-2199, U.S.A.

Reeder, J.R., "Refinements to the mixed-mode bending test for delamination toughness," Journal of Composites, Technology & Research, 2003, 25(4), 1-5. Paper ID CTR11949_254.

Russell, A.J., Street, K.N., "Moisture and temperature effects on the mixed-mode delamination fracture of unidirectional graphite/epoxy," in Delamination and Debonding of Materials, ASTM STP 876, W. S. Johnson, Ed., American Society for Testing and Materials, Philadelphia, 1985, 349-370. doi.org/10.1520/STP36314S.

Szekrenyes, A., "Prestressed fracture specimen for delamination testing of composites," International Journal of Fracture, 2006, 139(2), 213-237. doi:10.1007/s10704-006-0043-1.

Tracy, G.D., Feraboli, P., Kedward, K.T., "A new mixed mode test for carbon/epoxy composite systems," Composites Part A: Applied Science and Manufacturing, 2003, 34(11), 1125-1131. doi:10.1016/s1359-835x(03) 00205-7.

Troughton, M.J., (2008). Chapter 18—"Mechanical Fastening," In Handbook of plastics joining: A practical guide, Second Edition, 2008, Chapter 18, 175-201. Norwich: William Andrew.

Fard, M.Y., Liu, Y., Chattopadhyay, A., "Characterization of epoxy resin including strain rate effects using digital image correlation system," Journal of Aerospace Engineering, 2012, 25(2), 308-320. doi:10.1061/(ASCE) AS.1943-5525.0000127.

Fard, M.Y., Chattopadhyay, A., & Liu, Y., "Influence of load type and stress gradient on flexural strength of an epoxy resin polymeric material," Journal of Aerospace Engineering, 2014, 27(1), 55-63. doi:10.1061/(ASCE) AS.1943-5525.0000228.

Fard, M.Y., Raji, B., Woodward, J., Padilla, M., "Experimental characterization of damage mechanisms of seamless net-shaped circular pre-form and overlapped stitched composite pipes," Polymer Testing, 2019A, 78, 105934. doi:10.1016/j.polymertesting.2019.105934.

Fard, M.Y., Raji, B., Woodward, J.M., Chattopadhyay, A., "Characterization of interlaminar fracture modes I, II, and I-II of carbon/epoxy composites including in-service related bonding quality conditions" Journal of Polymer Testing, 2019b, 77, 105894. doi.org/10.1016/j.polymertesting.2019.05.010.

Fard, M.Y., Raji, B., Pankretz, H., "Correlation of nanoscale interface debonding and multimode fracture in polymer carbon composites with long-term hygrothermal effects," Journal of Mechanics of Materials, 2020, 150, 103601.doi.org/10.1016/j.mechmat.2020.103601.

Johnson, W.S., "Stress analysis of the crack-lap-shear specimen: An ASTM round-robin," Journal of Testing and Evaluation, 1987, 15(6), 303-324.

\* cited by examiner

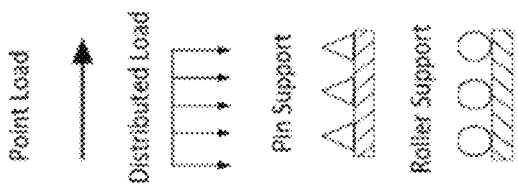
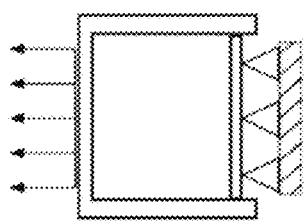
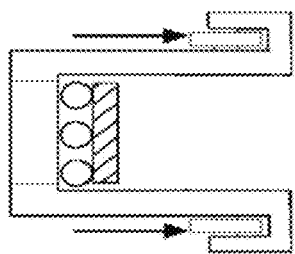
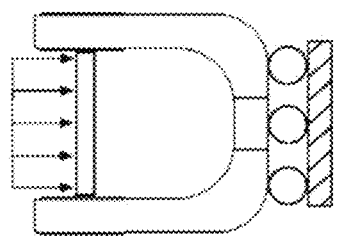
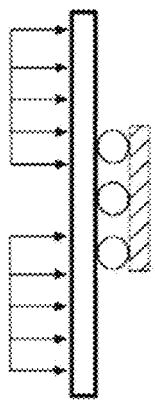
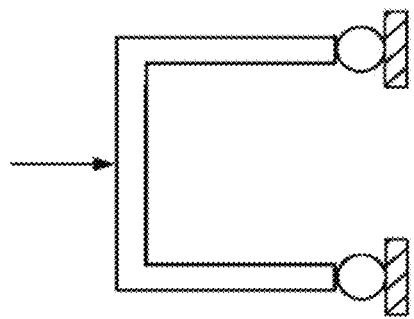
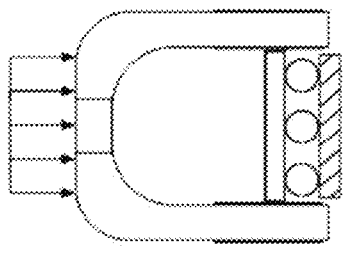
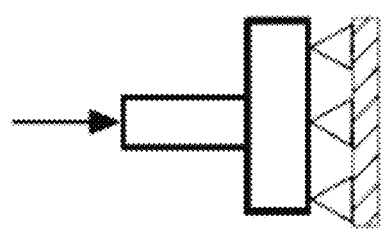
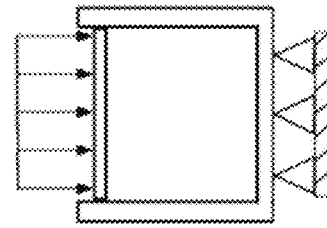
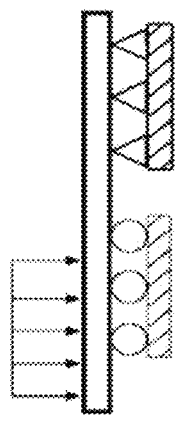

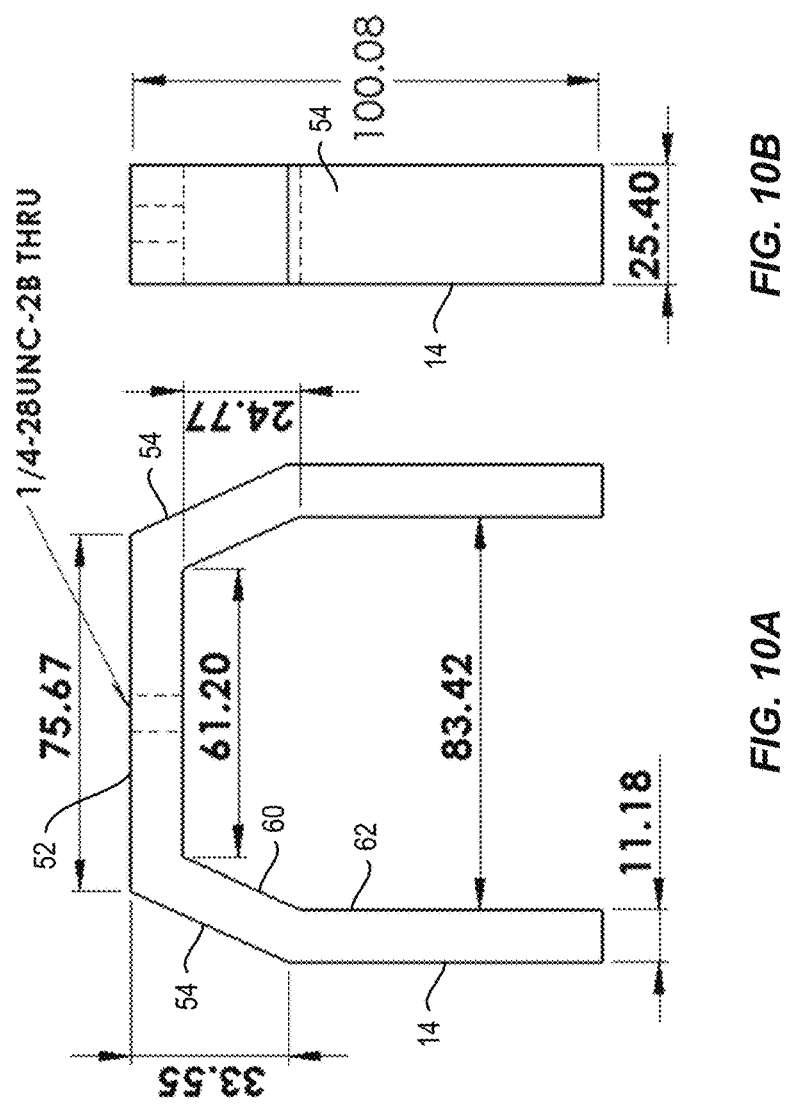
*FIG. 10A*
*FIG. 10B*
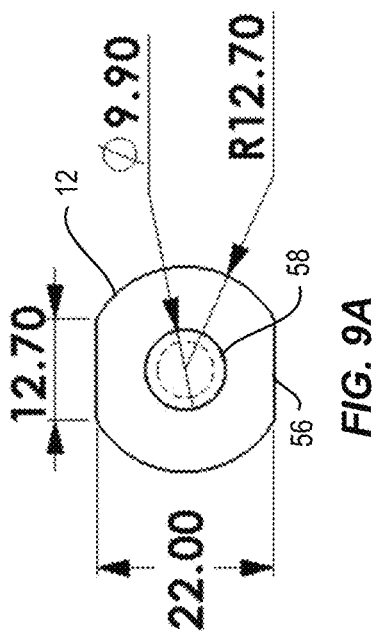
*FIG. 9A*
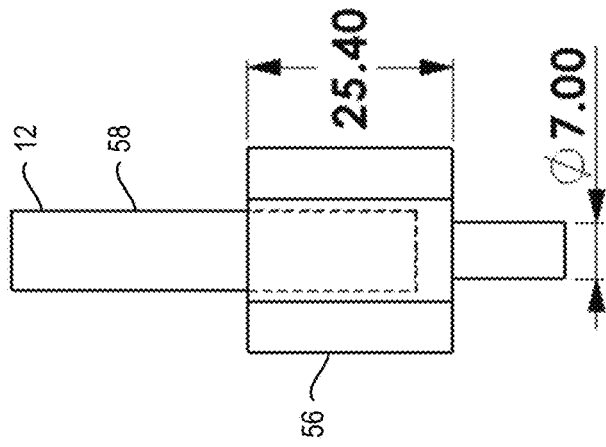
*FIG. 9B*

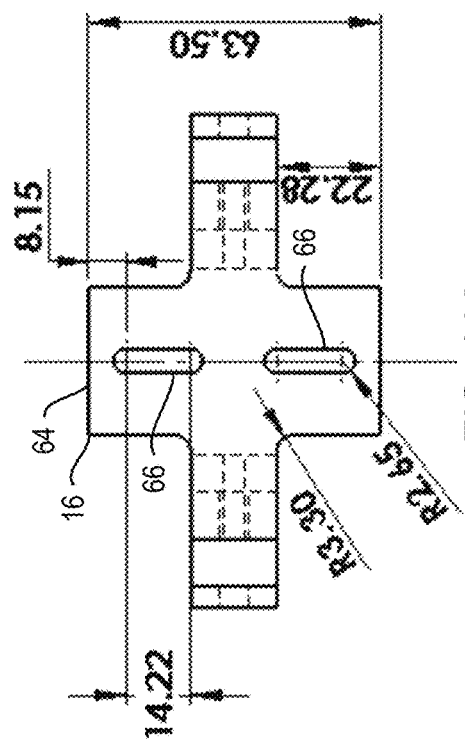
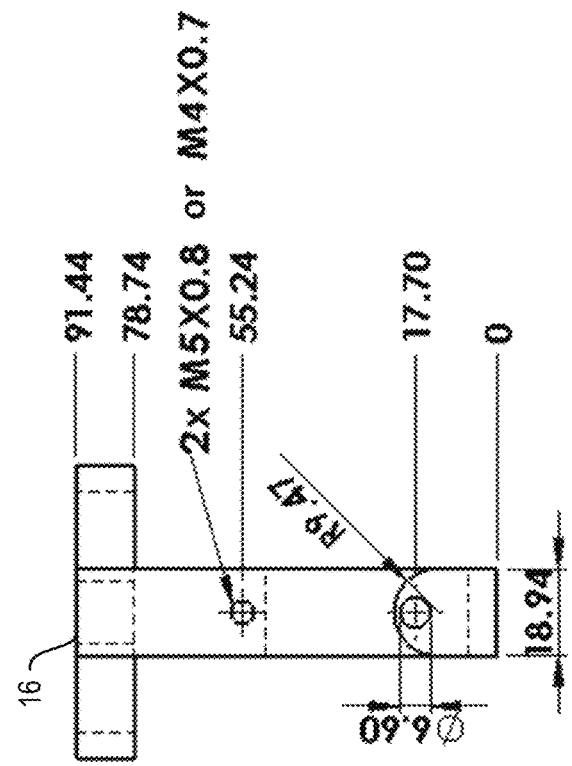
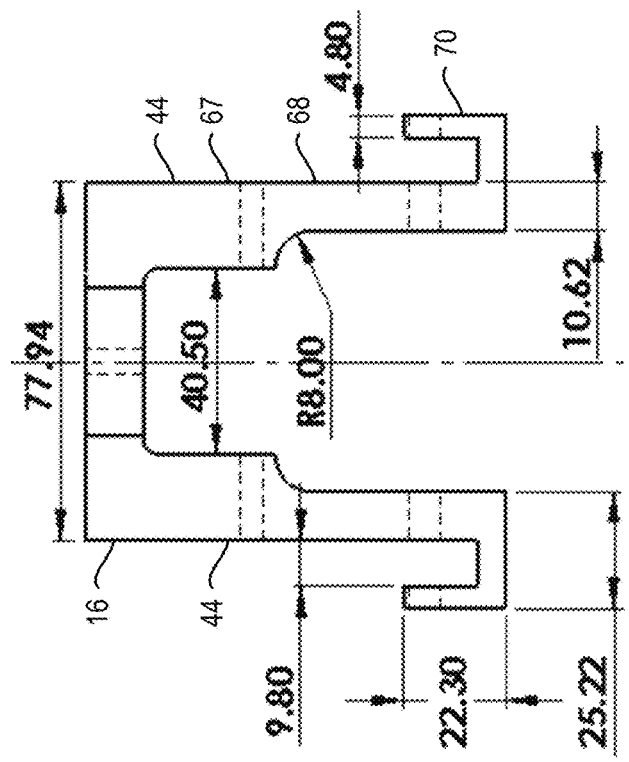
FIG. 11A
FIG. 11B
FIG. 11C

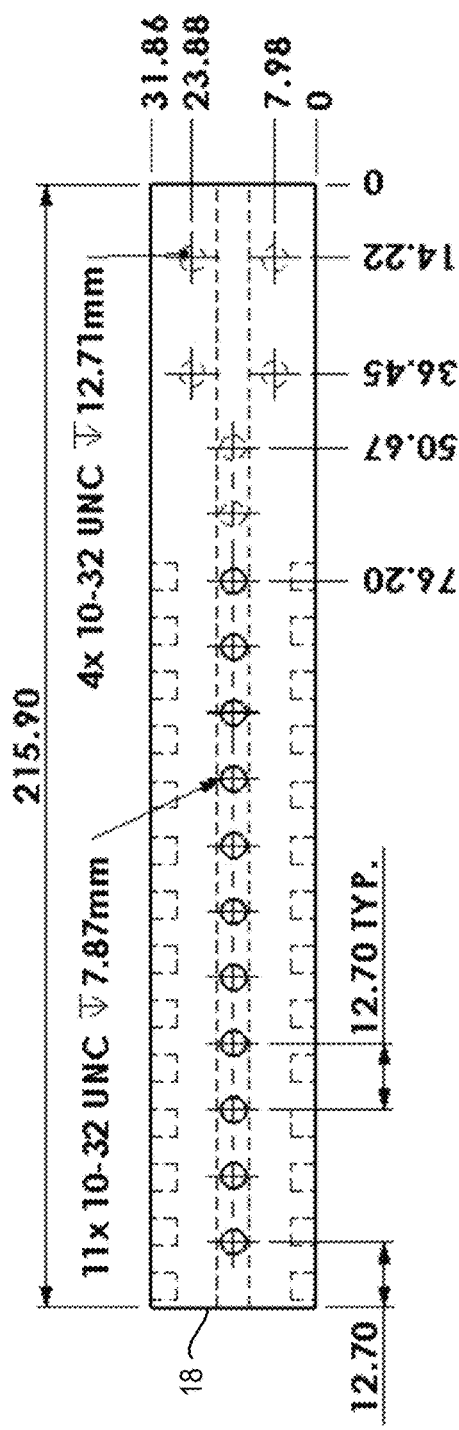
FIG. 12A
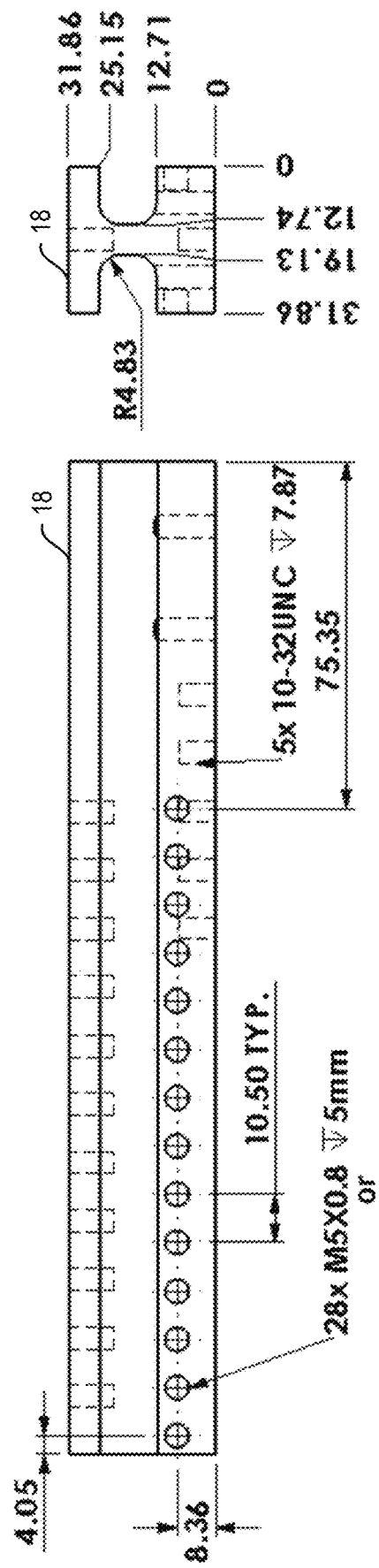
FIG. 12B
FIG. 12C

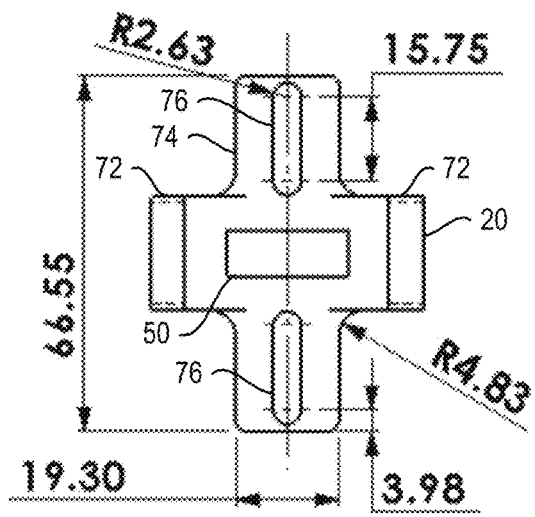
FIG. 13A
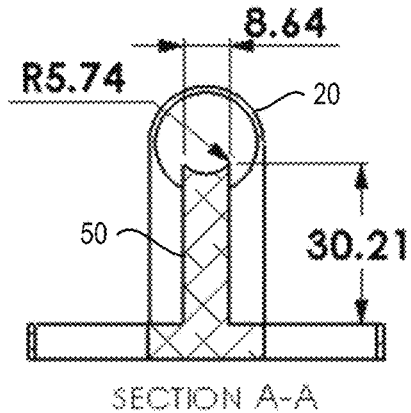
FIG. 13C
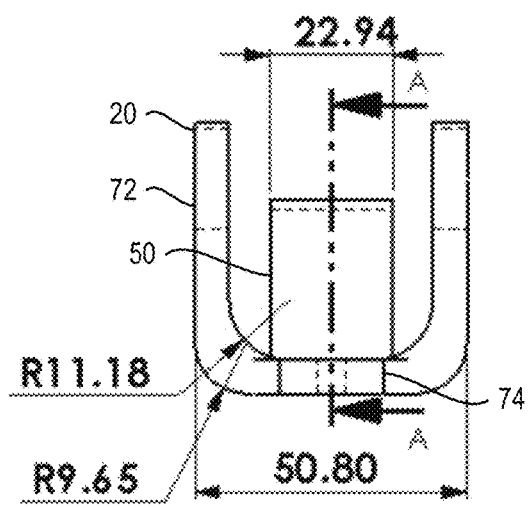
FIG. 13B
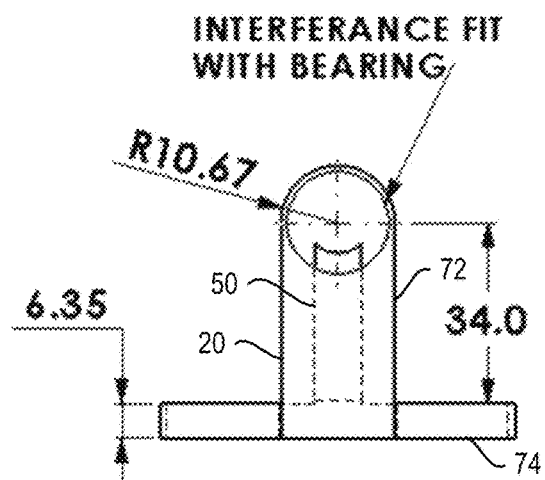
FIG. 13D
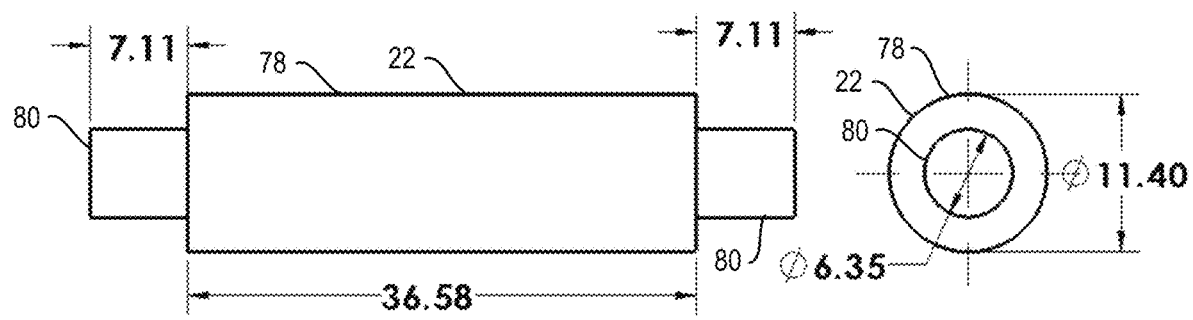
FIG. 14A
FIG. 14B

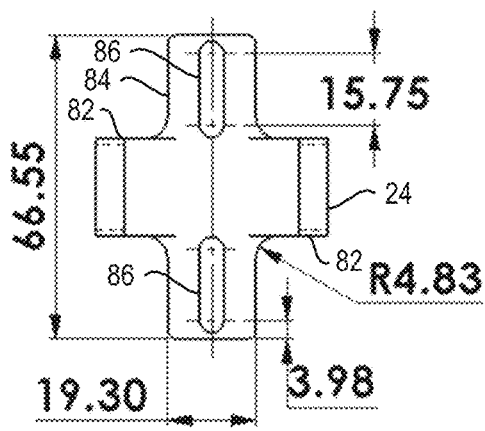
*FIG. 15A*
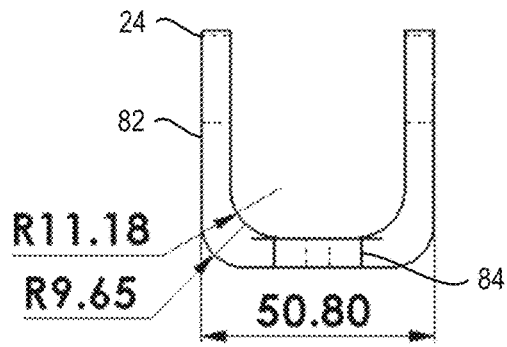
*FIG. 15B*
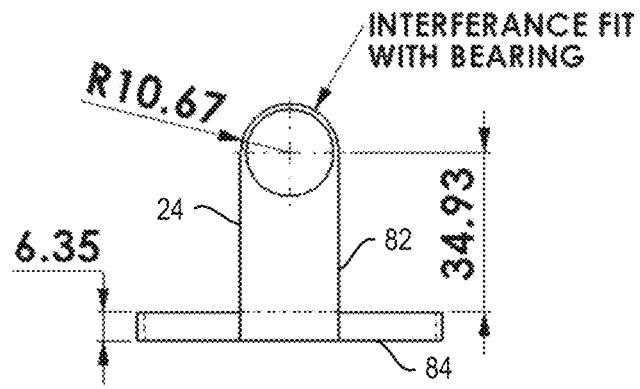
*FIG. 15C*
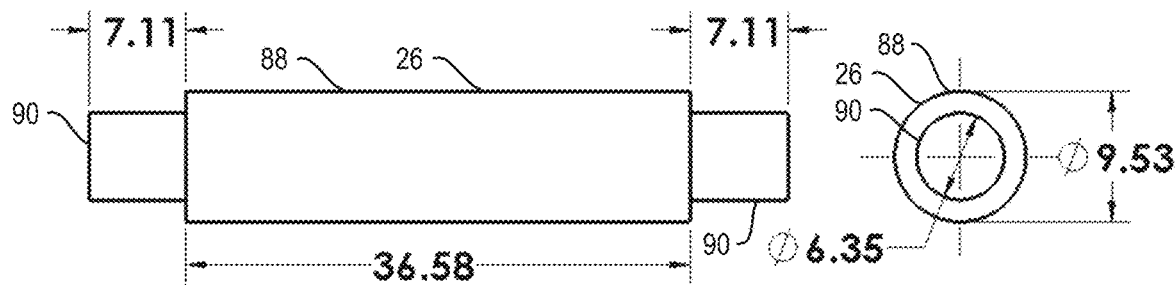
*FIG. 16A*  *FIG. 16B*

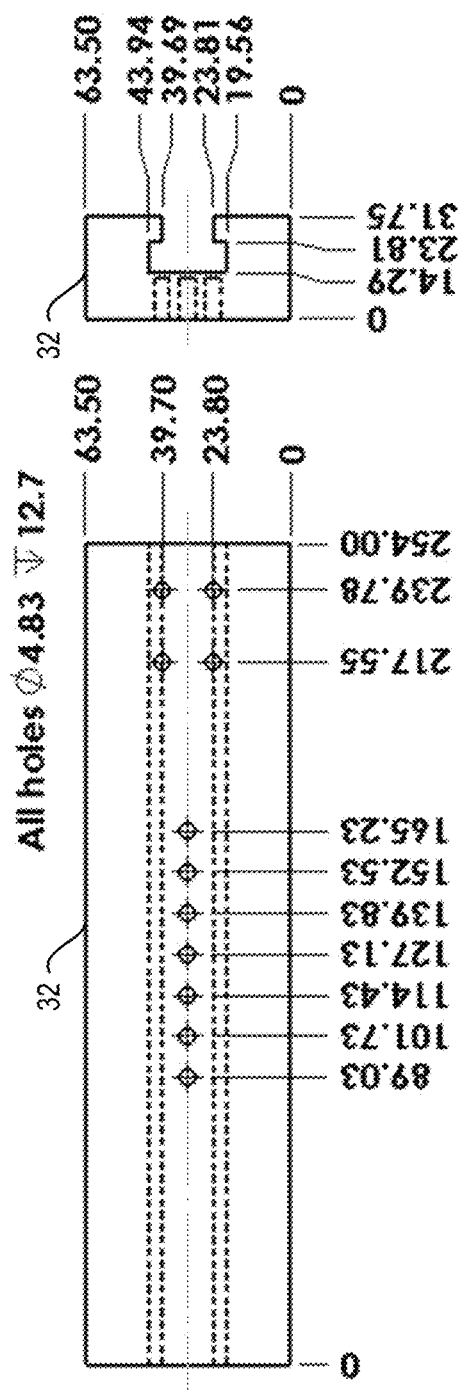
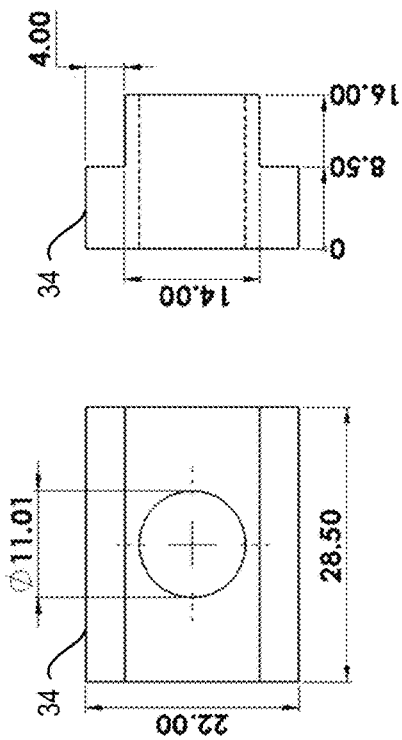
FIG. 19A
FIG. 19B
FIG. 20A
FIG. 20B

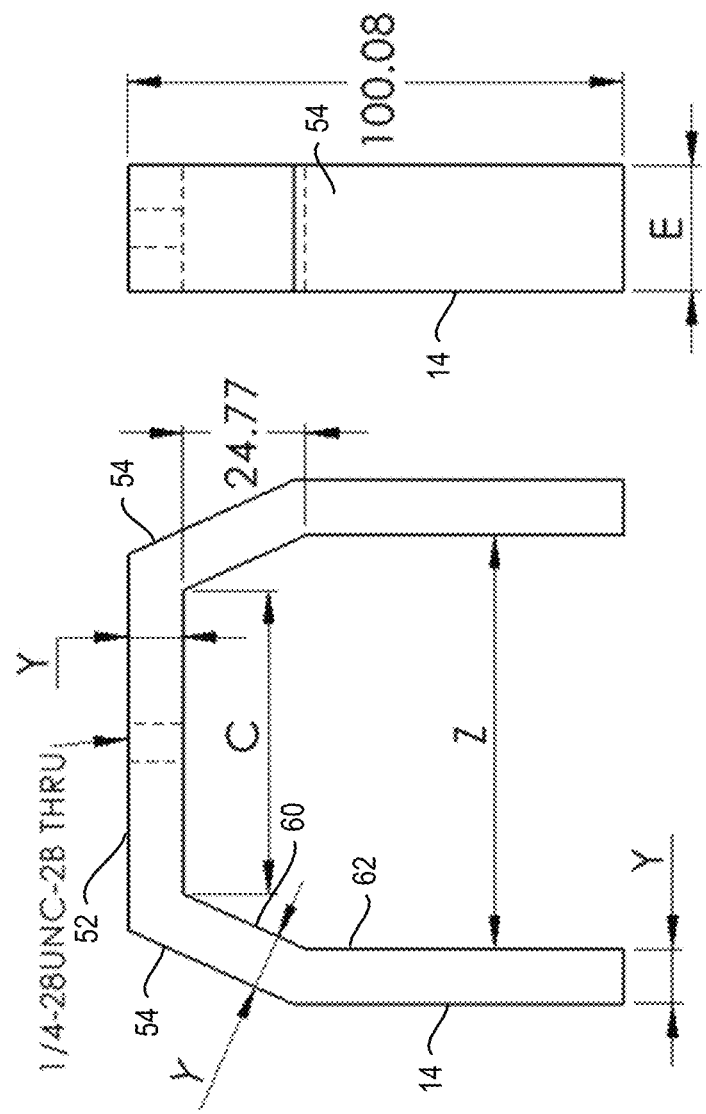

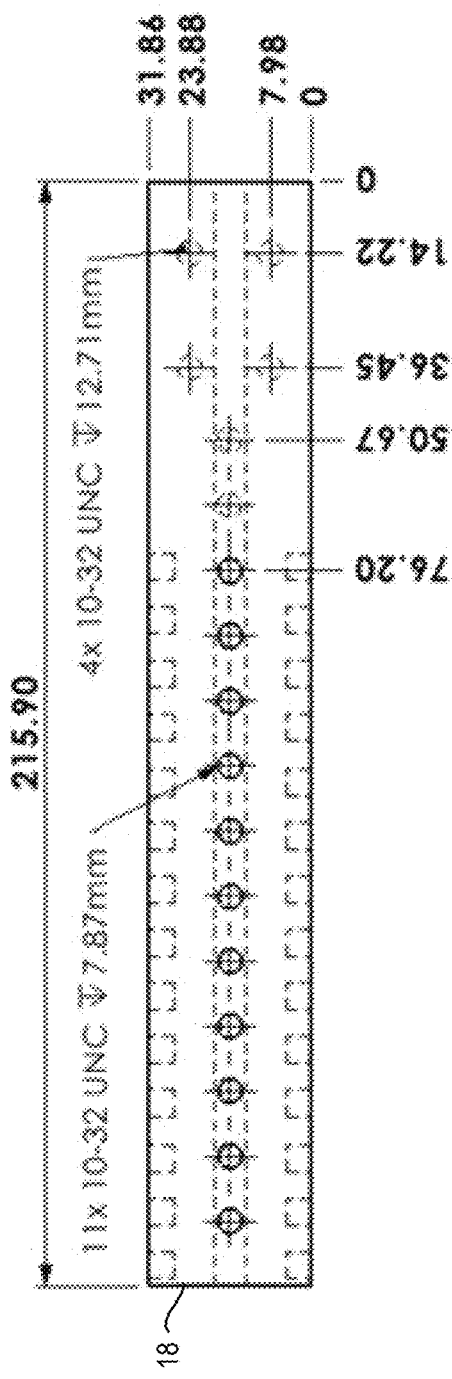
FIG. 23A
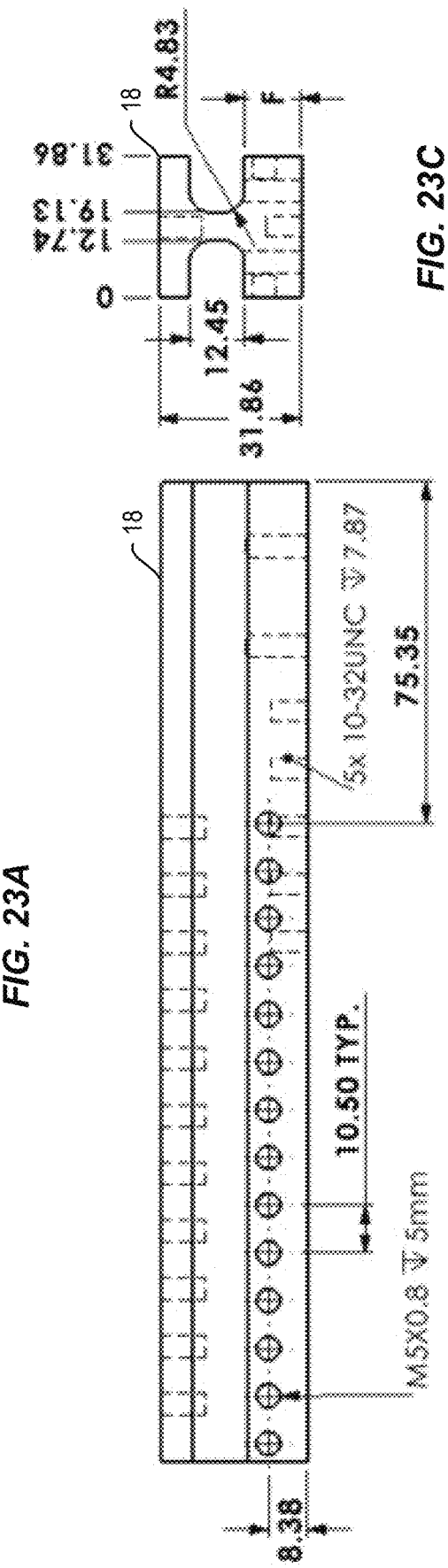
FIG. 23B
FIG. 23C

SECTION A-A

REINFORCED MIXED-MODE BENDING APPARATUS

CROSS-REFERENCE TO RELATED APPLICATIONS

This application claims the benefit of and priority to U.S. Provisional Application No. 63/253,834, filed Oct. 8, 2021, the disclosure of which is incorporated herein by reference in its entirety.

TECHNICAL FIELD

The present disclosure relates generally to fixtures for testing fracture and characterizing delamination in layered materials and more specifically to a reinforced mixed-mode bending apparatus.

BACKGROUND

Delamination is a primary failure mode for layered materials, such as composites and nanocomposites. In practice, delamination cracks initiate and propagate under a mixture of mode I (pulling/tension) and mode II (in-plane shear) load conditions, leading to separation of the layers of the material. In the past 40 years, several mixed-mode characterization techniques have been developed to determine a material's characteristics, such as the single-leg four-point bend (SLFPB), prestressed end-notched flexure (PENF), cracked lap shear (CLS), edge delamination tension (EDT), Arcan, asymmetric double cantilever beam, mixed-mode flexure, variable mixed-mode, and mixed-mode bending (MMB) test. The fixture complexity, the inconsistency of the mixed-mode ratio vs. crack length, and the complexity of the post-processing data are the main drawbacks of some of these techniques.

MMB is a pulling-mode load added to a mid-span end notched flexure (ENF) specimen. The MMB test has been recognized as a standard mixed-mode characterization technique due to clear advantages: (i) the use of simple beam theory equations of double cantilever beam (DCB) and ENF tests for analyzing data; (ii) the stable delamination growth; (iii) the applicability of the technique to a wide range of mode I/II ratios; and (iv) the consistency of the mixed-mode ratio during crack growth.

MMB was initially designed to characterize unidirectional composites' static toughness; however, researchers have used it to characterize fatigue fracture and adhesive toughness. MMB has been used to characterize glass/epoxy composite, carbon fiber/PEEK, and stitch-bonded composites. The lever rotation in MMB's original design caused a significant error in toughness calculation and changed the mixed-mode ratio.

FIG. 1 is a schematic diagram of the MMB fixture according to the current standard (ASTM 6671M-19). The MMB fixture contains eight main components: yoke (Y), saddle (S), lever (L), top roller (TR), a top hinge (TH), bottom roller (BR), a bottom hinge (BH), and base (B). The top and bottom rollers consist of three subcomponents: roller holder, roller, and bearing. The top and bottom hinges have two sub-components: hinge clamp and hinge. The MMB fixture also has a top connecting rod (TCR) to attach the yoke to the testing machine, and it is supported underneath the thick steel base by a base slider (BS) in a slot of the base rather than being clamped to a flat surface.

The bearing-mounted roller applies the midspan load and the left support reaction to the split-beam specimen to minimize the frictional forces. Aluminum hinges were bonded at the right end of the split-beam specimen arms to transfer the pulling forces. The mode I to mode II load ratio is changed by changing the distance between the saddle and the top-roller (length c).

In the MMB test, load and load-point displacements are recorded. The load-point displacement is usually determined from the crosshead position, including the compliance of the loading system and testing fixture. Scientists have emphasized the importance of the compliance of the fixture's internal components for different testing protocols.

The displacement measurements should be corrected for the compliance of the load frame and the MMB fixture. One approach to measuring the loading system's compliance ($C_{sys}$) is by measuring the stiffness of a bar of known stiffness (e.g., steel) and the slope of the load vs. load-point displacement curve ($m_{bar}$) as in Equation 1.

$$C_{sys} = \frac{1}{m_{bar}} - \frac{2L(c+L)^2}{E_{bar} b_{bar} t^3} \qquad \text{Equation 1}$$

where $E_{bar}$ and $b_{bar}$ are the elastic modulus and width of the bar, t is total thickness, L is the length, and c is the horizontal distance between the yoke and the top roller. The system compliance depends on c, and the compliance should be calculated for each mixed-mode ratio. The data needs to be corrected to account for the compliance, making post-processing of the data relatively complicated.

SUMMARY

A reinforced mixed-mode bending apparatus (RMMBA) is provided. Embodiments of the RMMBA provide new fixture designs for testing fracture and characterizing delamination in layered materials under combined mode I (pulling/tension) and mode II (in-plane shear) loads. The purpose of these designs is to provide a much less compliant fixture for conducting the Mixed Mode Bending (MMB) test. Embodiments described herein improve the accuracy of the MMB test and reduce the complexity of post-processing the collected data.

An exemplary embodiment provides a system for mixed mode characterization of a specimen. The system includes a lever; a saddle at least partially surrounding and laterally fixed to the lever; a yoke over the saddle and configured to carry an applied load to a specimen through axial force; and a top roller holder coupled below the lever and holding a top roller which transfers the applied load to a top surface of the specimen.

Another exemplary embodiment provides an RMMBA. The RMMBA includes a lever; a saddle at least partially surrounding the lever; a yoke over the saddle and configured to carry an applied load to a specimen, wherein the yoke comprises a top member connected with two angled yoke members; and a top roller holder coupled below the lever and holding a top roller which transfers the applied load to a top surface of the specimen.

In some embodiments, a reinforced mixed-mode bending apparatus (RMMBA) for testing fracture and characterizing delamination in layered materials includes a lever, a saddle disposed above a top surface of the lever and adjacent to two lateral sides of the lever (the saddle laterally fixed to the lever), a top roller holder disposed below and coupled to the lever (the top roller holder holding a top roller), and a yoke disposed over the saddle and configured to transfer an applied load to the top roller via the saddle, the lever, and the top roller holder. In some embodiments, the top roller is configured to transfer the applied load to a specimen being tested with the RMMBA.

In some embodiments, the saddle includes saddle legs. In some embodiments, each saddle leg is disposed adjacent to one of the two lateral sides of the lever. In some embodiments, the RMMBA also includes a plurality of fasteners. In some embodiments, each fastener extends from one of the saddle legs to the lever to laterally fix the saddle to the lever. In some embodiments, each fastener includes a bolt extending through one of the saddle legs and threaded into the lever.

In some embodiments, the top roller holder includes a support pillar in contact with and reinforcing the top roller. In some embodiments, the support pillar reduces deformation of the top roller under the applied load. In some embodiments, the yoke includes a top member disposed between angled yoke arms.

In some embodiments, the RMMBA also includes a bottom roller holder coupled to a base and holding a bottom roller that is configured to support a bottom surface of the specimen, a top hinge disposed below and coupled to an end of the lever, and a bottom hinge coupled to the base. In some embodiments, the top hinge and the bottom hinge accommodate the specimen therebetween.

In some embodiments, a reinforced mixed-mode bending apparatus (RMMBA) for testing fracture and characterizing delamination in layered materials includes a lever, a saddle disposed above a top surface of the lever and adjacent to two lateral sides of the lever, a top roller holder disposed below and coupled to the lever, and a yoke disposed over the saddle and configured to transfer an applied load to the top roller via the saddle, the lever, and the top roller holder. In some embodiments, the top roller holder includes a middle section and two roller arms extending from the middle section. In some embodiments, the top roller holder holds a top roller. In some embodiments, the top roller holder includes a support pillar disposed between the two roller arms. In some embodiments, the support pillar is in contact with and reinforces the top roller. In some embodiments, the top roller is configured to transfer the applied load to a specimen being tested with the RMMBA.

In some embodiments, the support pillar reduces deformation of the top roller under the applied load. In some embodiments, the middle section and the two roller arms of the top roller holder form a U shape. In some embodiments, the support pillar extends from the middle section to contact the top roller. In some embodiments, an end of the support pillar which contacts the top roller is rounded to accommodate the top roller. In some embodiments, the saddle is laterally fixed to the lever. In some embodiments, the yoke includes a top member disposed between angled yoke arms.

In some embodiments, a reinforced mixed-mode bending apparatus (RMMBA) for testing fracture and characterizing delamination in layered material includes a lever, a saddle disposed above a top surface of the lever and adjacent to two lateral sides of the lever, a top roller holder disposed below and coupled to the lever (the top roller holder holding a top roller), and a yoke disposed over the saddle. In some embodiments, the yoke includes a top member disposed between angled yoke arms. In some embodiments, the angled yoke arms are angled to reinforce the yoke. In some embodiments, the yoke is configured to transfer an applied load to a top roller via the saddle, the lever, and the top roller holder. In some embodiments, the top roller is configured to transfer the applied load to a specimen being tested with the RMMBA.

In some embodiments, each of the angled yoke arms include a low portion perpendicular to the top member and an angled upper portion. In some embodiments, the top roller holder includes a support pillar in contact with and reinforcing the top roller. In some embodiments, the saddle is laterally fixed to the lever. In some embodiments, the lever is an I-beam lever having a bottom flange which is thicker than a top flange.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 2A is a free body diagram of the top connecting rod of the traditional MMB fixture of FIG. 1.

FIG. 2B is a free body diagram of the yoke of the traditional MMB fixture of FIG. 1.

FIG. 2C is a free body diagram of the saddle of the traditional MMB fixture of FIG. 1.

FIG. 2D is a free body diagram of the top hinge of the traditional MMB fixture of FIG. 1.

FIG. 2E is a free body diagram of the bottom hinge of the traditional MMB fixture of FIG. 1.

FIG. 2F is a free body diagram of the top roller of the traditional MMB fixture of FIG. 1.

FIG. 2G is a free body diagram of the bottom roller of the traditional MMB fixture of FIG. 1.

FIG. 2H is a free body diagram of the base slider of the traditional MMB fixture of FIG. 1.

FIG. 2I is a free body diagram of the lever of the traditional MMB fixture of FIG. 1.

FIG. 2J is a free body diagram of the base of the traditional MMB fixture of FIG. 1.

FIG. 2K is a legend for the symbols used in FIGS. 2A-2J.

FIG. 9A is a top schematic diagram of the top connecting rod of the RMMBA of FIG. 7A.

FIG. 9B is a front schematic diagram of the top connecting rod of FIG. 9A.

FIG. 10A is a front schematic diagram of the yoke of the RMMBA of FIG. 7A.

FIG. 10B is a side schematic diagram of the yoke of FIG. 10A.

FIG. 11A is a top schematic diagram of the saddle of the RMMBA of FIG. 7A.

FIG. 11B is a front schematic diagram of the saddle of FIG. 11A.

FIG. 11C is a side schematic diagram of the saddle of FIG. 11A.

FIG. 12A is a top schematic diagram of the lever of the RMMBA of FIG. 7A.

FIG. 12B is a side schematic diagram of the lever of FIG. 12A.

FIG. 12C is a front schematic diagram of the lever of FIG. 12A.

FIG. 13A is a bottom schematic diagram of the top roller holder of the RMMBA of FIG. 7A.

FIG. 13B is a front schematic diagram of the top roller holder of FIG. 13A.

FIG. 13C is a cross-sectional diagram taken along line A-A of the top roller holder of FIG. 13B.

FIG. 13D is a side schematic diagram of the top roller holder of FIG. 13A.

FIG. 14A is a front schematic diagram of the top roller of the RMMBA of FIG. 7A.

FIG. 14B is a side schematic diagram of the top roller of FIG. 14A.

FIG. 15A is a top schematic diagram of the bottom roller holder of the RMMBA of FIG. 7A.

FIG. 15B is a front schematic diagram of the bottom roller holder of FIG. 15A.

FIG. 15C is a side schematic diagram of the bottom roller holder of FIG. 15A.

FIG. 16A is a front schematic diagram of the bottom roller of the RMMBA of FIG. 7A.

FIG. 16B is a side schematic diagram of the bottom roller of FIG. 16A.

FIG. 19A is a top schematic diagram of the base of the RMMBA of FIG. 7A.

FIG. 19B is a front schematic diagram of the base of FIG. 19A.

FIG. 20A is a bottom schematic diagram of the base slider of the RMMBA of FIG. 7A.

FIG. 20B is a front schematic diagram of the base slider of FIG. 20A.

FIG. 21A is a front schematic diagram of the yoke, similar to FIG. 10A, with variable parameters indicated.

FIG. 21B is a side schematic diagram of the yoke, similar to FIG. 10B, with variable parameters indicated.

FIG. 23A is a top schematic diagram of the lever, similar to FIG. 12A, with variable parameters indicated.

FIG. 23B is a side schematic diagram of the lever, similar to FIG. 12B, with variable parameters indicated.

FIG. 23C is a front schematic diagram of the lever, similar to FIG. 12C, with variable parameters indicated.

DETAILED DESCRIPTION

Figure 1:
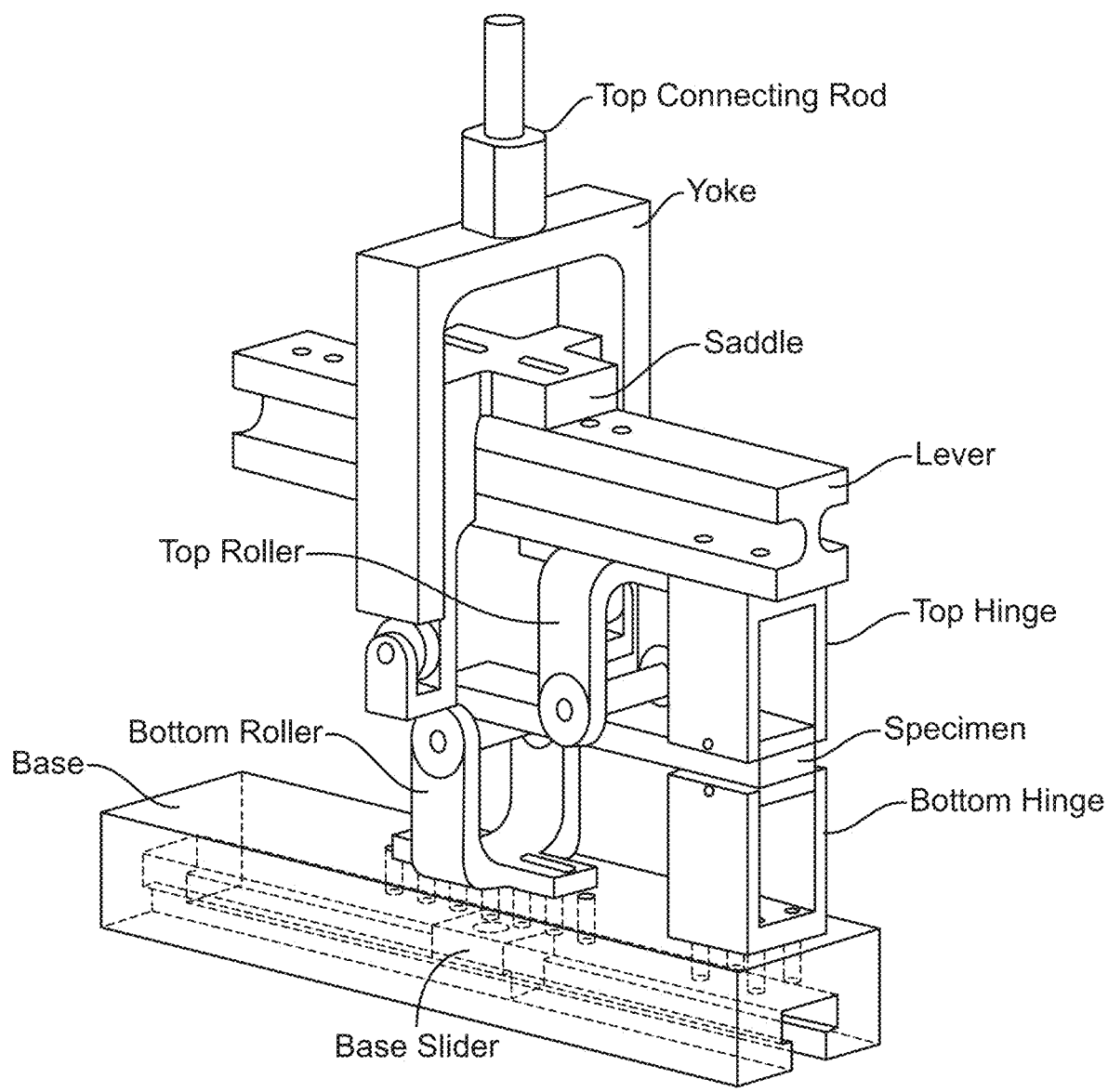
FIG. 1 is a schematic diagram of a mixed-mode bending (MMB) fixture according to the current standard (ASTM 6671M-19).

In the following detailed description, reference is made to the accompanying drawings which form a part hereof, and which are shown by way of illustration embodiments that may be practiced. The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the figures. It will be understood that these terms and those discussed above are intended to encompass different orientations of the device in addition to the orientation depicted in the figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

A reinforced mixed-mode bending apparatus (RMMBA) is provided. The RMMBA is a new fixture design for testing fracture and characterizing delamination in layered materials under combined mode I (pulling/tension) and mode II (in-plane shear) loads. The purpose of this design is to provide a much less compliant fixture for conducting the Mixed Mode Bending (MMB) test. Embodiments described herein improve the accuracy of the MMB test and reduce the complexity of post-processing the collected data.

I. Introduction

The MMB test is commonly used to investigate the fracture toughness of layered materials such as carbon fiber/epoxy composites, glass/epoxy composites, and stitch-bonded composites. An analytical model was developed herein to be used along with a numerical based optimization technique to improve the traditional MMB fixture, resulting in the RMMBA. The analytical model provides an understanding of the complex interactions between the components of the fixture. The change in the geometry, load transfer mechanism, and boundary conditions in RMMBA compared to the initial fixture reduces the fixture's compliance and enhances the accuracy of the mixed-mode tests significantly. The accurate fracture characterization of materials improves safety and security and saves money for industries such as space technology, aerospace, defense, energy, transportation, and public health.

A. Material Properties and Modeling

The traditional MMB fixture of FIG. 1 was modeled using SolidWorks 2019 according to the dimensions per ASTM standard 6671M-19. All holes were left unthreaded, and the bearings were modeled as simple cylinders to simplify the model. These changes have a negligible effect on the stiffness calculation of the fixture. The saddle, lever, and roller holders are made from aluminum 6061 with a yield strength of 276 megapascals (MPa) and elastic modulus of 69 gigapascals (GPa).

The split-beam specimen is modeled as a rigid body. All other components were modeled as low carbon steel 1018 having a yield strength of 370 MPa and an elastic modulus of 200 GPa. The split-beam specimen contains a typical pre-crack that helps load transfer to the MMB's lower assembly in the FEA model. The linear elastic 3D models were built in ANSYS version 2019R3 simulation software. A quadratic hexahedral-dominated 3D solid element was chosen for higher accuracy. Mesh convergence studies were performed for each component, and the most efficient element size of 1 millimeter (mm) was used for all subsequent simulations. Bonded contacts and weak springs were implemented for all models to avoid under-constrained boundary conditions.

B. Stiffness of MMB Components

The maximum applied force to the traditional MMB fixture is limited to the maximum load-carrying capacity of the fixture's weakest component to avoid excessive local stress within the fixture. The components' free-body diagrams are illustrated in FIGS. 2A-2J based on the fixture's load transfer mechanism.

FIG. 2A is a free body diagram of the top connecting rod of the traditional MMB fixture of FIG. 1. FIG. 2B is a free body diagram of the yoke of the traditional MMB fixture of FIG. 1. FIG. 2C is a free body diagram of the saddle of the traditional MMB fixture of FIG. 1. FIG. 2D is a free body diagram of the top hinge of the traditional MMB fixture of FIG. 1. FIG. 2E is a free body diagram of the bottom hinge of the traditional MMB fixture of FIG. 1. FIG. 2F is a free body diagram of the top roller of the traditional MMB fixture of FIG. 1. FIG. 2G is a free body diagram of the bottom roller of the traditional MMB fixture of FIG. 1. FIG. 2H is a free body diagram of the base slider of the traditional MMB fixture of FIG. 1. FIG. 2I is a free body diagram of the lever of the traditional MMB fixture of FIG. 1. FIG. 2J is a free body diagram of the base of the traditional MMB fixture of FIG. 1. FIG. 2K is a legend for the symbols used in FIGS. 2A-2J.

The Distortion Energy (DE) theory was considered to calculate the maximum load-carrying capacity of every component. For the saddle, the critical point is at the uppermost fillets, where a stress concentration factor of 2 is presumed based on the fillet radius ratio to the height of the cross-section. The maximum effective stress at the critical point determines the saddle's load-carrying capacity as 4689 newtons (N).

For the lever, the load, shear, and moment diagrams vary with the parameter c. The expression for the maximum moment remains unchanged for c<65 mm and c>65 mm, $(P_c(c+16.7))/(c+50)$. The values of c for the extremum of the moment expression are not within the permissible range between 0 and 108.9 mm. The load-carrying capacity for the maximum moment of 86.08 pascals (P) at c=108.9 mm is 16474 N.

Table 1 shows the load-carrying capacity for all the components. A loading force of 1000 N was chosen based on Table 1 to maintain a minimum design factor of —2 for all of the MMB fixture. The components were modeled separately, considering the free body diagrams shown in FIGS. 2A-2J. The largest deformation area was investigated, and the equivalent stiffness for each component was calculated, as shown in Table 2. The vertical deformation was recorded in the applied force line of action for the lever and base, allowing them to be modeled as linear springs with the other components.

TABLE 1

Load-carrying capacity of the components in MMB fixture

| Component (Abbreviation) | Load-Carrying Capacity (N) | Material |
| --- | --- | --- |
| Top connecting rod (TCR) | 14239 | steel |
| Yoke (Y) | 6381 | steel |
| Saddle (S) | 4689 | aluminum |
| Lever (L) | 16474 | aluminum |
| Top/bottom roller (TR, BR) | 5226 | aluminum |
| Top/bottom hinge (TH, BH) | 2110 | steel |
| Base (B) | 335736 | steel |
| Based slider (BS) | 54391 | steel |

TABLE 2

Components' stiffnesses in MMB fixture

| Component | Stiffness (kN/mm) |
| --- | --- |
| Top connecting rod | 764.6 |
| Yoke | 41.86 |
| Saddle | 8.60 |
| Lever | 253 |
| Top hinge | 164 |
| Bottom hinge | 164 |
| Top roller | 49.43 |
| Bottom roller | 49.43 |
| Base | 2440 |
| Base slider | 9199 |

C. Stiffness of MMB Fixture

Figure 3:
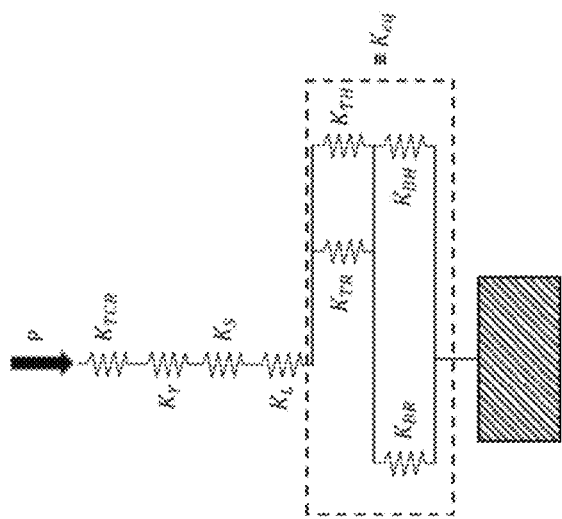
FIG. 3 is a schematic diagram of an analytical spring model for the traditional MMB fixture of FIG. 1.

FIG. 3 is a schematic diagram of an analytical spring model for the traditional MMB fixture of FIG. 1. The analytical model was developed to determine the relationship between the components' stiffnesses and the MMB fixture's stiffness. The model assumes each component as a linear spring with a spring constant corresponding to the values shown in Table 2. The springs are combined in series except for the two hinges and two rollers that are not in series with the other components.

Figure 4B:
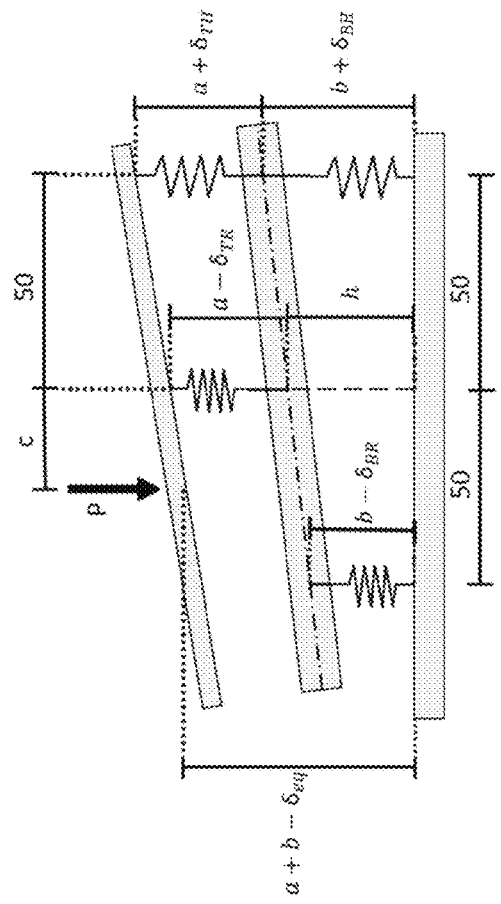
FIG. 4B is a schematic diagram of the analytical spring model of the top and bottom rollers and hinges after deformation.
Figure 4A:
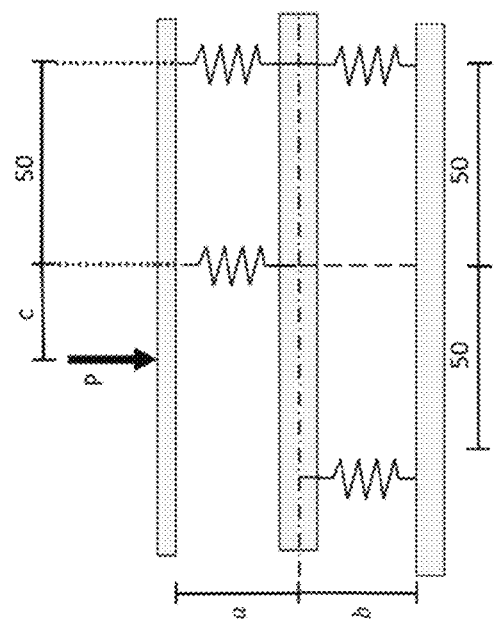
FIG. 4A is a schematic diagram of the analytical spring model of the top and bottom rollers and hinges before deformation.

FIG. 4A is a schematic diagram of the analytical spring model of top and bottom rollers and hinges before deformation. FIG. 4B is a schematic diagram of the analytical spring model of the top and bottom rollers and hinges after deformation. FIGS. 4A and 4B illustrate how the springs of these four components are situated in the model. a and b represent the undeformed distances between the rigid specimen, base, and the lever. The equivalent stiffness of the top and bottom rollers and hinges is equal to the ratio of the applied load, P, to the displacement, $\delta_{eq}$, in the force's line of action.

Similarly, the displacement of each member is related to its internal force and stiffness:

$$\delta_{TR} = \frac{P\frac{c+50}{50}}{K_{TR}},$$

$$\delta_{TH} = \frac{P\frac{c}{50}}{K_{TH}},$$

Equation 2

$$\delta_{BR} = \frac{P\frac{c+50}{100}}{K_{BR}},$$

$$\delta_{BH} = \frac{P\frac{c-50}{100}}{K_{BH}}$$

where K and δ are stiffness and deformation, and the subscripts (TR, TH), (BR, BH) represents top roller and hinge, and bottom roller and hinge, respectively.

The model's total displacement in FIG. 4B is related to the individual components' displacements following the deformation compatibility.

$$a + b - \delta_{eq} = \\ (h + a - \delta_{TR}) + \frac{c}{50}[(h + a - \delta_{TR}) - (b + \delta_{BH} + a + \delta_{TH})]$$

Equation 3 where h is the average of two distances.

$$h = b + \frac{\delta_{BH} - \delta_{BR}}{2}$$

Equation 4

By combining Equations 2 and 3, one can find an expression for the equivalent stiffness of the subsystem ($K_{eq}$) in FIG. 4B, which depends on the parameter c.

$$\frac{1}{K_{eq}} = \\ \frac{1}{K_{BH}}\left(\frac{c-50}{100}\right)^2 + \frac{1}{K_{BR}}\left(\frac{c+50}{100}\right)^2 + \frac{1}{K_{TR}}\left(\frac{c+50}{100}\right)^2 + \frac{1}{K_{TH}}\left(\frac{c}{50}\right)^2$$

Equation 5

The equivalent spring of the subsystem is combined in series with the other components giving the following expression for MMB stiffness:

$$\frac{1}{K_{MMB}} = \frac{1}{K_{TCR}} + \frac{1}{K_Y} + \frac{1}{K_L} + \frac{1}{K_{eq}} + \frac{1}{K_S}$$

Equation 6

The compliance of the fixture depends on the parameter c. As c is increased for higher mode I applications, $K_{eq}$ decreases, reducing the fixture's stiffness. Using Equation 6 and Table 2 shows that the MMB fixture's stiffness is almost 3.95 KN/mm for a c value of 50 mm.

A finite element model of the MMB fixture was used to verify the analytical prediction of fixture stiffness. The MMB was simulated with a c value of 50 mm using the same loading force (1000 N) and the mesh quality as the components. The measured stiffness was 4.46 KN/mm and 12.9% higher than the analytical model. This discrepancy could be due to the bonded contacts in the fixture model and extra fixity due to the 3D stiffness properties in the finite element model, creating more fixity than those present in the individual component simulations. The analytical model, Equations 5 and 6, and Table 2 show that the MMB stiffness will be particularly sensitive to changes in the most compliant components: saddle and yoke.

Figure 5:
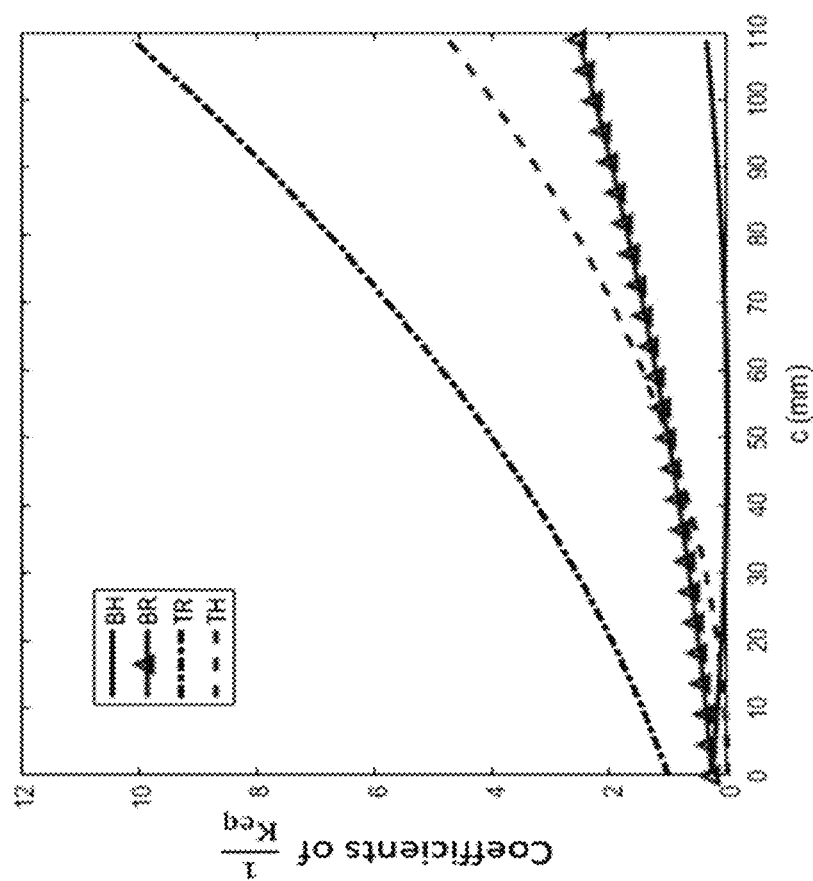
FIG. 5 is a graphical representation of the effects of the top roller, top hinge, bottom roller, and bottom hinge on their combined equivalent stiffness ($K_{eq}$).

FIG. 5 is a graphical representation of the effects of top roller, top hinge, bottom roller, and bottom hinge on their combined equivalent stiffness ($K_{eq}$). Equation 5 indicates that the top roller has a disproportionate contribution to the fixture's compliance because it bears a higher load than all other subsystem components, especially at higher c values, as shown in FIG. 5.

Figure 6:
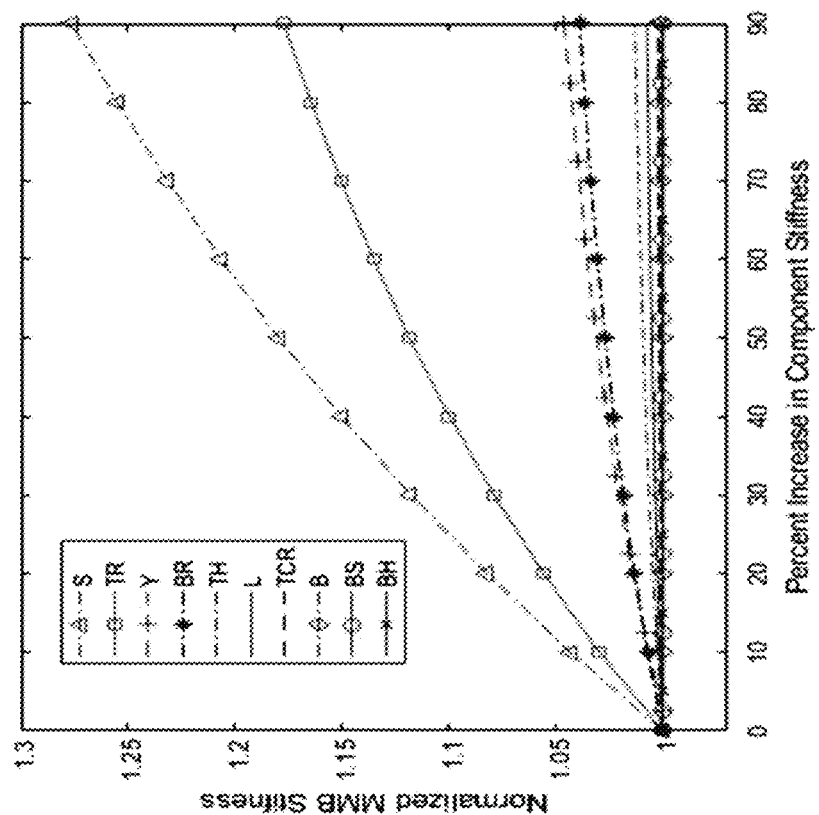
FIG. 6 is a graphical representation of the effects of change in components' stiffness on the fixture stiffness.

FIG. 6 is a graphical representation of the effects of change in components' stiffness on the fixture stiffness. Percentage changes in each component's stiffness on the normalized MMB stiffness are presented for c=50 mm using the analytical model. Based on this analysis, the saddle, yoke, and top roller were chosen to be redesigned.

II. Design Improvements

Embodiments of the RMMBA were invented for energy measurement of fracture specimens. An embodiment of the RMMBA consists of several components, as depicted in FIGS. 7A-20B. Compliance in a test fixture introduces error into the fracture energy measurement, and the current complex data post-processing correction technique requires multiple assessments of the fixture's compliance. The RMMBA avoids all of the corrections and results in a more accurate characterization. The RMMBA described herein was designed using the analytical model and finite-element based optimization described above. The loading mechanism of the RMMBA was designed as a roller and support pillar with an optimized stiffness to weight ratio to add enough rigidity and reduce or eliminate the errors in the fracture energy measurement.

Three sources of improvements were identified to design embodiments of the RMMBA. One is the saddle, in which deformation is mostly due to inward rotation of its legs due to the moment created by the applied force. Secondly, the top roller's maximum displacement occurs in the center of the steel roller, where the deflection under the applied load is largest. Third, it is the yoke's right angle that causes higher rotation due to relatively larger moments.

In embodiments of the RMMBA, the inward rotation of the saddle was countered by designing a reinforcing mechanism. Dimensions of the saddle and top toller were optimized to increase the fixture's stiffness. The saddle was further designed to accommodate a lateral mechanism that increases the vertical rigidity of the apparatus. The yoke was designed to transfer the load to the saddle by combining axial and flexural components rather than all flexural to reduce deformation and enhance rigidity.

Embodiments of the RMMBA leverage all the benefits of traditional MMB techniques while increasing the accuracy significantly and improving the fracture experiment. An exemplary embodiment of the RMMBA has shown an 87% increase in stiffness over the current techniques. This enhanced stiffness improves the experiment's quality and reduces the complexity of post-processing calculations, leading to a safer crack-resistant design. The increase in the accuracy also allows for materials with a more extensive range of elastic modulus to be tested. Stiffer laminated composites that were previously beyond the current testing techniques can now be characterized with reliability.

Figure 7B:
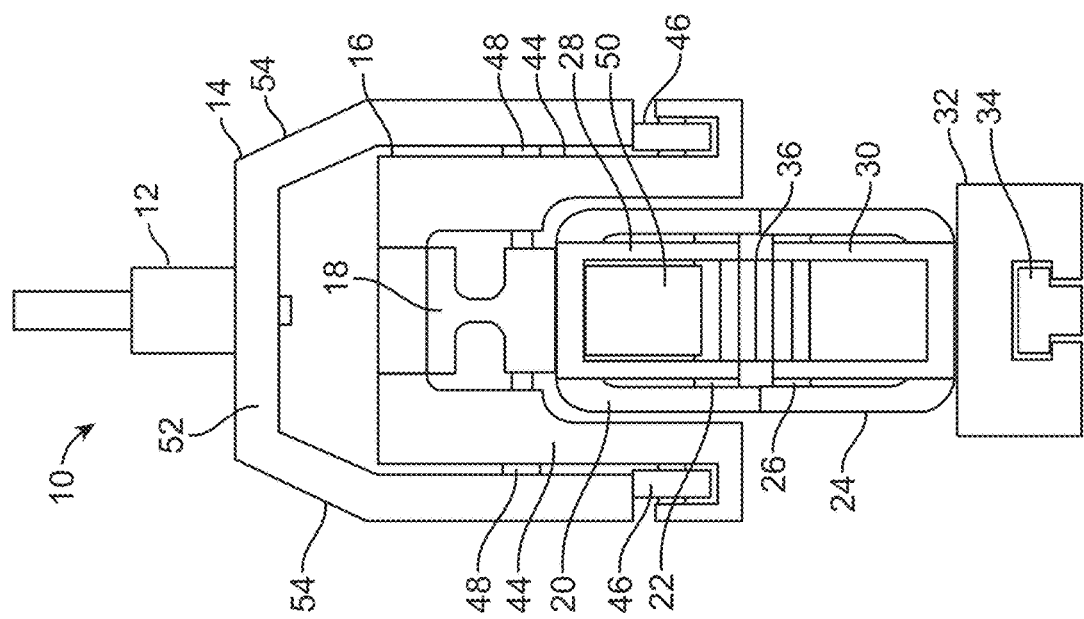
FIG. 7B is a front view of the RMMBA of FIG. 7A.
Figure 7A:
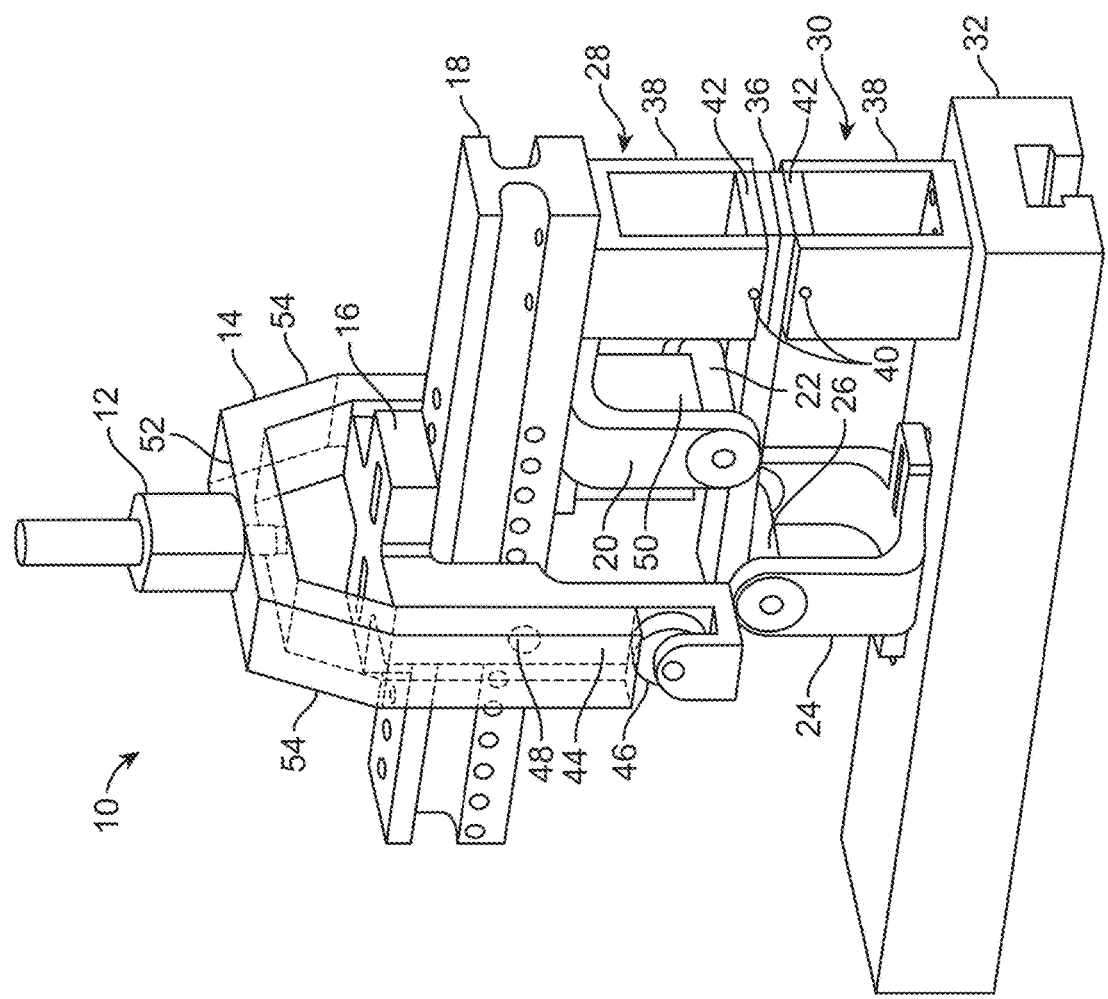
FIG. 7A is an isometric view of a reinforced mixed-mode bending apparatus (RMMBA) according to embodiments described herein.

FIG. 7A is an isometric view of an RMMBA 10 according to embodiments described herein. FIG. 7B is a front view of the RMMBA 10 of FIG. 7A. Similar to the traditional MMB fixture, the RMMBA 10 includes a top connecting rod 12, a yoke 14, a saddle 16, a lever 18, a top roller holder 20, a top roller 22, a bottom roller holder 24, a bottom roller 26, a top hinge 28, a bottom hinge 30, a base 32, and a base slider 34. A test specimen 36 is placed between the top roller 22 and the bottom roller 26, as well as between the top hinge 28 and the bottom hinge 30. Each of the bottom hinge 30 and the top hinge 28 includes a hinge clamp 38, a hinge pin 40, and a hinge tab 42 which contacts the test specimen 36.

In an exemplary aspect, the bottom roller holder 24 and bottom hinge 30 (at the hinge clamp 38) are attached to the base 32. The span length 2L can be set to a desired value, where span length is the lateral distance between the center of the bottom roller 26 and the center of the hinge pin 40 of the bottom hinge 30. Generally, an axis of the bottom roller 26 is aligned parallel to an axis of the hinge pin 40 of the bottom hinge 30.

The top roller holder 20 and top hinge 28 (at the hinge clamp 38) are attached to the lever 18 such that the lateral distance between the center of the hinge pin 40 of the top hinge 28 and the center of the top roller 22 is half the span length, or L. This attachment is generally made such that an axis of the top roller 22 is parallel to an axis of the hinge pin 40 of the top hinge 28 and that both are perpendicular to a longitudinal axis of the lever 18. In addition, the hinge pin 40 of the top hinge 28 is generally vertically aligned with the hinge pin 40 of the bottom hinge 30.

The saddle 16 includes saddle legs 44 which extend past the lever 18 and a saddle bearing 46 attached to each saddle leg 44. In some embodiments, each saddle leg 44 is disposed adjacent to a lateral side of lever 18. The saddle 16 is attached to the lever 18 such that the saddle 16 surrounds the lever 18 on three sides. For example, as shown in FIGS. 7A and 7B, saddle 16 is disposed above a top surface of lever 18 and adjacent to two lateral sides of lever 18. Saddle 16 may be attached to lever 18 at a location that results in a length along a line of the lever 18 between the top roller 22 and a center line of each saddle bearing 46 that equals the desired lever 18 length c. The center line of the saddle bearings 46 and the center line of the top roller 22 should also be parallel. This can be accomplished by making sure that they are both perpendicular to the length of the lever 18.

The test specimen 36 is attached to the base 32 by holding the test specimen 36 flush against the bottom roller 26 while tightening the hinge tab 42 in the bottom hinge 30. The hinge tab 42 should be inserted into the bottom hinge 30 far enough so that the longitudinal axis of the test specimen 36 is parallel to the top plane of the base 32.

Next, the lever 18 is attached by holding the top roller 22 flush to the test specimen 36 while tightening the hinge tab 42 in the top hinge 28. The hinge tab 42 should be inserted far enough into the top hinge 28 so that the lower plane of the lever 18 is parallel with the longitudinal axis of the test specimen 36. The loading yoke 14 is placed over the saddle 16 until it contacts the saddle bearings 46. The RMMBA 10 is placed in a load frame (not shown) clamping the base 32 firmly to a bottom plate of the machine such that the axis of the saddle bearings 46 is parallel to the axis of the loading yoke 14.

As described above, the RMMBA 10 is used to load split laminate test specimens 36 to determine the delamination fracture toughness at various ratios of Mode I to Mode II loading. The composite test specimen 36 can consist of a rectangular, uniform thickness, unidirectional laminated composite specimen, containing a nonadhesive insert at the midplane which serves as a delamination initiator. Loading forces are applied to the test specimen 36 via the hinge tabs 42 of the top hinge 28 and bottom hinge 30 that are applied near the ends of the delaminated section of the test specimen 36 and through the rollers 22, 26 that bear against the test specimen 36 in the nondelaminated region.

The base 32 of the RMMBA 10 holds the test specimen 36 stationary while the lever 18 loads the test specimen 36.

The base 32 attaches to the bottom hinge 30 and also bears on the test specimen 36 near the far end with the bottom roller 26. The lever 18 attaches to the top hinge 28 and bears down on the test specimen 36 halfway between the bottom roller 26 and the hinge tabs 42. The top roller 22 acts as a fulcrum so by pushing down on the lever 18 opposite the top hinge 28, the top hinge 28 is pulled up.

The length of the lever 18, c, can be changed to vary the ratio of the load pulling on the top hinge 28 to the load bearing through the top roller 20, thus changing the mode mixture of the test. The load is generally applied to the lever 18 such that the load remains vertical during the loading process. To reduce geometric nonlinear effects as a result of lever 18 rotation, the lever 18 is generally loaded such that the height of loading is slightly above the pivot point where the lever 18 attaches to the test specimen 36.

A record of the applied load versus opening displacement can be recorded on an x-y recorder, or equivalent real-time plotting device or stored digitally. The interlaminar fracture toughness and mode mixture are calculated from critical loads read from the load displacement curve.

Figure 8B:
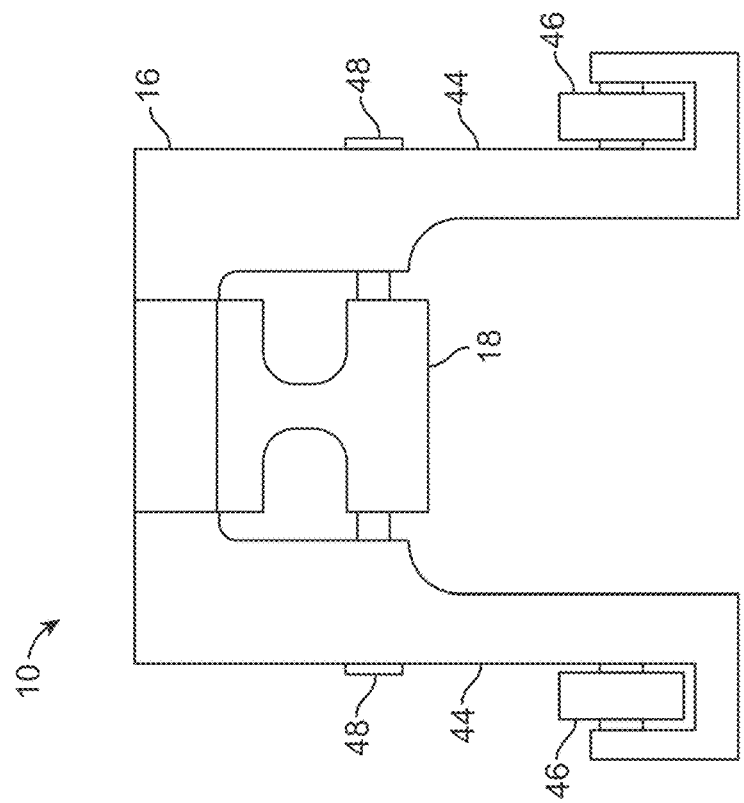
FIG. 8B is a front view of the saddle and lever of FIG. 8A.
Figure 8A:
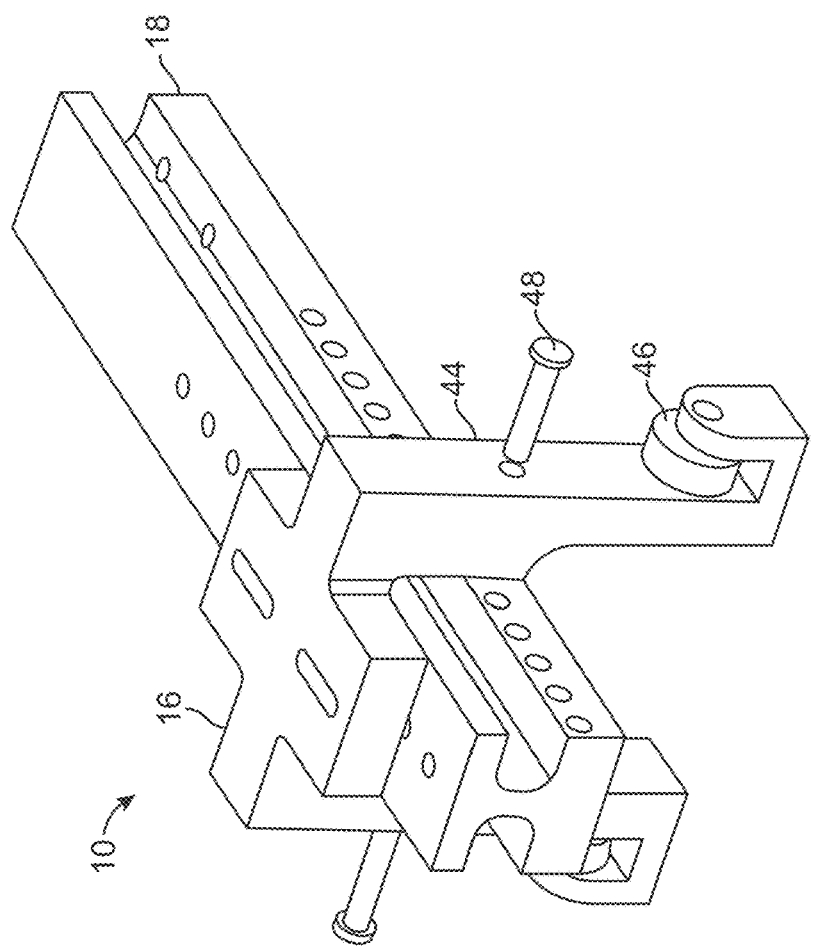
FIG. 8A is an isometric view of the saddle and lever of the RMMBA of FIG. 7A.

FIG. 8A is an isometric view of the saddle 16 and lever 18 of the RMMBA 10 of FIG. 7A. FIG. 8B is a front view of the saddle 16 and lever 18 of FIG. 8A.

With reference to FIGS. 7A, 7B, 8A, and 8B, embodiments of the RMMBA 10 include one or more of the following improvements. First, in some embodiments the saddle 16 is laterally fixed to the lever 18 to reduce bending of the saddle legs 44. For example, bolts 48 or other fasteners may be inserted through the saddle legs 44 and come in contact with or thread into the lever 18. Second, in some embodiments the top roller holder 20 includes a support pillar 50 to reinforce the top roller 22 (e.g., reduce its deflection). Third, in some embodiments the yoke 14 includes a top member 52 (e.g., where the top connecting rod 12 attaches) between angled yoke arms 54, where the angled yoke arms 54 are angled to reinforce the yoke 14.

These improvements are further described below at Sections II.A and II.B with reference to FIGS. 7A-14B. The components of the RMMBA 10 are further illustrated, along with example dimensions (in mm), in FIGS. 9A-14B. It should be understood that the example dimensions shown are for an optimized embodiment of the RMMBA 10, and the dimensions of other embodiments may vary according to design and/or manufacturing differences. A standard machining tolerance of ±0.13 mm is acceptable for all of the components.

A. Optimized Dimensions of the Saddle and Top Roller

The analytical model described above proved the upper part of the traditional MMB fixture, above the specimen, has a significant role in the fixture's compliance. The top roller 22 is one of the crucial components for rigidity, makes contact with the top of the test specimen 36, and it is centered between the bottom hinge 30 and bottom roller 26. The diameter of the top roller 22 should be larger than the bottom roller 26 since it is exposed to a larger load. The top roller holder 20 includes the support pillar 50 to reduce its deflection. The saddle legs 44 that extend downwards on either side of the lever 18 rotate and deform significantly.

In a first aspect, the stiffness of the RMMBA 10 is increased by altering critical dimensions of the saddle 16 and top roller 22 using an adaptive multi-objective optimization algorithm. The deformation and weight were minimized while ensuring the Von Mises stress never exceeds 120% of its original value, and it is less than the yield strength. The algorithm varies dimensional parameters of the finite-element models to find an optimal solution.

The width and thickness of the saddle legs 44 were selected as the saddle 16 optimization parameters to resist the inward bending moment due to the loading force of the yoke 14. The revised dimension of the saddle 16 adds additional stiffness and reduces the deformation. The optimization algorithm confirms that a slight increase in the primary diameter of the top roller 22 reduces deflection in the steel roller. The converged solution for the two components resulted in a ~34% increase in the stiffness of the saddle 16 and a 54% increase in the stiffness of the top roller 22; however, to maintain clearance between the yoke 14 and the new saddle 16, the span of the yoke 14 needed to be widened. This increased span length creates a larger moment arm on the yoke 14 leading to a reduction in stiffness. An additional optimization was utilized to mitigate this effect by angling the angled yoke arms 54 to carry more axial stress and experience less rotation from bending. According to the analytical model, these three new components' combined effect should result in a 27% increase in fixture stiffness. A simulation based on these optimizations resulted in a higher stiffness (5.32 KN/mm) but only differed from the predicted value (5 KN/mm) by 6.4%.

The detailed dimensions of these components are shown in the figures: the yoke 14 (FIGS. 10A and 10B), the top roller holder 20 (FIGS. 13A-13D), and the top roller 22 (FIGS. 14A and 14B).

B. Lateral Reinforcement of the Saddle and Further Improvements

In a second aspect, a reinforcing mechanism was designed to pass through the saddle legs 44 and screw into either side of the lever 18 to provide extra rigidity to the saddle 16, as shown in FIGS. 8A and 8B. Maintaining the system's symmetry during the fracture experiment was pondered by securing equal tightening with equal torque. The yoke 14 fits over the top of the saddle 16 and rests on two saddle bearings 46. The geometry of the yoke 14 was designed to carry a significant part of the applied load through axial force rather than bending moment to reduce the deformation and enhance the rigidity of the upper part of RMMBA 10.

The base slider 34 and top connecting rod 12 are attached to two ends of a testing machine, which applies a known vertical load and measures load-point displacement. The base 32 and base slider 34 have high rigidity, and their weight has no detrimental effect on the accurate measurement of fracture properties. When a vertical load is applied, the top roller 22 pushes down on the middle of the test specimen 36 and acts as a fulcrum for the lever 18 while the top hinge 28 pulls upward on the cracked end of the test specimen 36. By recording the force and the load-point displacement, the fracture toughness of the test specimen 36 under mixed-mode loading conditions is determined.

To further reduce bending of the saddle legs 44, in some embodiments, two steel M5 bolts 48 or other fasteners 48 are used as a lateral reinforcement. In some embodiments, the bolts 48 screw into threaded holes on both sides of the saddle 16 (e.g., at a saddle leg 44) and are tightened until they contact the lever 18. This contact creates a moment to counter the moment generated by the applied load, thus reducing the legs' rotation and the maximum deformation. Thus, in some embodiments, each fastener 48 extends from one of saddle legs 44 to lever 18 to laterally fix saddle 16 to lever 18. In some embodiments, the bolts are cut to the required length (e.g., 23 mm) and have a low-profile head height (e.g., <2 mm) to ensure clearance between the yoke 14 and saddle 16. The careful alignment of the saddle 16, lever 18, and bolts 48 is necessary to measure fracture energy correctly. A small difference between the rotational angles of bolts 48 with the lever 18 could lead to asymmetric crack propagation.

In some embodiments, the lever 18 also includes threaded holes, and the bolts 48 screw into both the lever 18 and the saddle 16. This avoids asymmetry due to inconsistent contacts between the lever 18 and saddle 16. Similar to the above embodiments, the bolts 48 are cut to the required length (e.g., 27 mm) and have a low-profile head height (e.g., <2 mm) to ensure clearance between the yoke 14 and saddle 16.

Furthermore, to create more available surface area for the contact between the bolts 48 and lever 18, the bottom flange height of the lever 18 was increased by 2 mm while keeping the total lever 18 height the same. The lever's original design is an aluminum I-beam, which is much stiffer than the split-beam specimen. The revised lever 18 is still an I-beam with symmetry to the vertical axis. The stiffness of the revised lever 18 reduces; however, due to its low participation in the overall stiffness (see FIG. 6), its impact on the stiffness is negligible.

In some embodiments, the top roller 22 was further redesigned by adding a support pillar 50 underneath the steel roller, which significantly reduces deformation. The support pillar 50 is part of the aluminum top roller holder 20 and is designed to make lubricated contact with the steel roller to prevent frictional effects.

Further details of the components are illustrated in the figures, including the design of the saddle 16 (FIGS. 11A-11C), the lever 18 (FIGS. 12A-12C), and the top roller holder 20 (FIGS. 13A-13D). The RMMBA 10 deforms evenly across its width. The apparatus should fulfill symmetrical and alignment criteria for a uniform crack growth of the split-beam test specimen 36.

With these further modifications, the measured stiffness of the finite-element model of the RMMBA 10 was 8.36 KN/mm, within an 8.9% difference of the analytical model (9.11 KN/mm), validating the developed spring model. Unlike the original MMB, the finite-element model showed a lower stiffness than the analytical model. This is likely because in this design, the bolts couple the lever 18 and saddle 16 together. They can no longer be considered separate springs in series, which causes a slight difference between the analytical model and the validation finite-element model. Additionally, the bolts' lateral compression force on the lever 18 reduces the stiffness of the lever 18 in the vertical direction, leading to a lower overall stiffness than the prediction from the spring model. The finite-element model showed an ~87% improvement in stiffness over the finite-element model of the original MMB, validating the results of the analytical model and the improvements of the RMMBA 10 described herein.

One potential drawback of the RMMBA 10 design could be the upper assembly's additional weight, contributing to the system's preloading. The effects of the additional weight on the center of gravity and the mixed-mode fracture toughness are critical for accurate fracture characterization. The saddle 16 is moved to create different mixed-mode ratios. Moving the saddle 16 changes the center of gravity of the subsystem, including saddle 16 and lever 18. The extra weight of the top roller 22 handle acts along the centerline of the fulcrum and contributes to the pure mode II. The roller assembly mass was increased from ~105 grams (g) in the original MMB to ~128 g in RMMBA 10. The mass increase has a negligible effect on preloading the split-beam test specimen 36 in mode II. The saddle 16 mechanism moves when the lever 18 load point is changed; thus, the center of gravity of the lever 18 and saddle 16 $c_g$ also changes. The expression of $c_g$ for MMB and RMMBA 10 is (0.338c+21.62) mm and (0.393c+19.84) mm, respectively.

The largest error in $G_I$ happens at large c values, while the largest error in $G_{II}$ occurs at small c values. Assuming c=97.5 mm and c=16.8 mm, the estimates of error in SERR calculation for mode I and II ($e_{IC}$ and $e_{IIC}$) are presented in Equations 7 and 8

$$e_{IC} = 1.3\left(\frac{c_g}{L} - \frac{1}{3}\right)\frac{aP_g}{\sqrt{G_{Ic}bIE_{11}}} \times 100 \qquad \text{Equation 7}$$

$$e_{IIC} = 0.43\left(\frac{c_g}{L} + 1\right)\frac{aP_g}{\sqrt{G_{IIc}bIE_{11}}} \times 100 \qquad \text{Equation 8}$$

where L is the half span length, a is the crack length, b and I are width and moment of inertia of the split-beam test specimen 36, $E_{11}$ is the flexural longitudinal elastic modulus of the composite material. $G_{Ic}$ and $G_{IIc}$ are the critical SERR for modes I and II. $P_g$ is the weight of the lever 18 and saddle 16, which is 6.07N for MMB and 6.61N for RMMBA 10.

Data of stitch-bonded biaxial polymer matrix composites were used from a mixed-mode fracture study (L=50 mm, b=20 mm, a=36 mm, I=853.3 mm$^4$, $G_{Ic}$=0.3 Nmm/mm$^2$, $G_{II}$=3.2 Nmm/mm$^2$). The estimated errors of SERR for mode I and II are 1.1% and 0.23% using the traditional MMB fixture. In the case of RMMBA 10, the corresponding estimated errors are 1.3% and 0.24%, confirming the negligible effect of the added weight on SERR.

III. Example RMMBA with Optimized Dimensions

FIGS. 9A-14B illustrate the components of the RMMBA 10 with exemplary optimized dimensions (in mm). FIG. 9A is a top schematic diagram of the top connecting rod 12 of the RMMBA 10 of FIG. 7A. The top connecting rod 12 includes a standoff nut 56 with opposing flat sides and rounded ends. The flat sides are 12.70 mm long and the rounded ends are 22.00 mm wide with a 12.70 mm radius to center. The standoff nut 56 includes a 9.90 mm diameter rod 58 extending from its top.

FIG. 9B is a front schematic diagram of the top connecting rod 12 of FIG. 9A. The standoff nut 56 is 25.40 mm high and a threaded stud with a 7.00 mm diameter extends from its bottom.

FIG. 10A is a front schematic diagram of the yoke 14 of the RMMBA 10 of FIG. 7A. The yoke 14 includes the top member 52, which includes a tapped 1/4-28UNC-2B opening which is centered and may extend through the top member 52 (e.g., to accept the threaded stud of the top connecting rod 12). The top member 52 has a top length of 75.67 mm and a bottom length of 61.20 mm. The top member 52 is between two angled yoke arms 54 with angled upper portions 60 and bottom portions 62 which are perpendicular to the top member 52. Angled upper portions 60 are positioned at a non-perpendicular and non-parallel angle with respect to top member 52. The angled yoke arms 54 each have a thickness of 11.18 mm. The angled upper portions 60 have an outside height of 33.55 mm and an inside height of 24.77 mm. The bottom portions 62 are spaced 83.42 mm apart.

FIG. 10B is a side schematic diagram of the yoke 14 of FIG. 10A. The yoke 14 has an overall width of 25.40 mm and an overall height of 100.08 mm.

FIG. 11A is a top schematic diagram of the saddle 16 of the RMMBA 10 of FIG. 7A. The saddle 16 includes two saddle legs 44 extending as one piece outward and downward from a middle section 64. The middle section 64 meets each saddle leg 44 at a rounded corner with a radius of 3.30 mm. The middle section 64 is rectangular, with a length of 63.50 mm (extending 22.28 mm from an edge of each saddle leg 44) and two oblong mounting holes 66 aligned along the length of the middle section 64. The mounting holes 66 are rectangles with rounded ends, where the ends have a radius of 2.65 mm and are spaced 14.22 mm on center, with one end aligned with an edge of the saddle legs 44 and the other end 8.15 mm from one of the long ends of the middle section 64.

FIG. 11B is a front schematic diagram of the saddle 16 of FIG. 11A. An overall width of the saddle 16 is 77.94 mm. Each saddle leg 44 includes an upper section 67 which accommodates the lever 18 which thins to a lower section 68 ending in a saddle bearing holder 70. The upper sections 67 are spaced 40.50 mm apart and include fastener openings (e.g., threaded openings) through which the bolts 48 or other fasteners pass. The lower sections 68 meet the upper sections 67 with rounded corners having a radius of 8.00 mm. Each lower section 68 is 10.62 mm wide. Each saddle bearing holder 70 extends outward (e.g., away from the middle section 64) in an L shape from the corresponding lower section 68. A width of the combined lower section 68 and saddle bearing holder 70 is 25.22 mm. A width from the outside of the lower section 68 and upper section 67 to the inside of the saddle bearing holder 70 is 9.80 mm. A height of the saddle bearing holder 70 is 22.30 mm, and an outside width of its L shape is 4.80 mm.

FIG. 11C is a side schematic diagram of the saddle 16 of FIG. 11A. A width of each saddle leg 44 is 18.94 mm. A height from a bottom edge of the saddle 16 to an axis of the saddle bearing 46 is 17.70 mm, and the saddle bearing holder 70 (and the lower section 68) includes a 6.60 mm diameter opening to accommodate the saddle bearing 46. A height from the bottom edge of the saddle 16 to a center line of the fastener opening is 55.24 mm. In an exemplary aspect, the fastener opening accommodates an M5×0.8 or M4×0.7 bolt. A height from the bottom edge of the saddle 16 to a bottom of the middle section 64 is 78.74 mm. A height from the bottom edge of the saddle 16 to a top of the saddle 16 is 91.44 mm.

FIG. 12A is a top schematic diagram of the lever 18 of the RMMBA 10 of FIG. 7A. The lever 18 has a length of 215.90 mm and a width of 31.86 mm. A top surface of the lever 18 includes a series of eleven 10-32 UNC holes with a depth of 7.87 mm aligned on center with the width of the lever 18 for mounting to the saddle 16. The first hole is 12.70 mm from center to an edge of the lever 18 away from the top hinge 28, and the holes are spaced 12.70 mm on center. A bottom surface of the lever 18 includes four 10-32 UNC holes with a depth of 12.71 mm for mounting to the top hinge 28. Each hole is 7.98 mm away from a wide edge of the lever 18, with a first pair being 14.22 mm from an end of the lever 18 and a second pair being 36.45 mm from the end.

FIG. 12B is a side schematic diagram of the lever 18 of FIG. 12A. The bottom edge further includes five 10-32 UNC holes with a depth of 7.87 mm aligned on center with the width of the lever 18. The first hole is 50.67 mm from center to the edge of the lever 18 where the top hinge 28 attaches, and the holes are spaced 12.70 mm on center (e.g., such that three of these align with holes in the top surface). Each side of the lever 18 includes twenty-eight M5×0.8 or M4×0.7 threaded holes with a depth of 5 mm to accommodate the bolts 48 or other fasteners. The first hole is 4.05 mm from center to the edge of the lever 18 away from the top hinge 28, the last hole is 75.35 mm from center to the edge attached to the top hinge 28, and the holes are spaced 10.50 mm on center. The holes are 8.36 mm from center to the bottom surface of the lever 18.

FIG. 12C is a front schematic diagram of the lever 18 of FIG. 12A. The lever 18 is 31.86 mm high, with beveled sides. The bevels begin at 12.71 mm and end at 25.15 mm from the bottom surface. The bevels extend 12.74 mm into the lever 18, and have rounded inner corners with a radius of 4.83 mm.

FIG. 13A is a bottom schematic diagram of the top roller holder 20 of the RMMBA 10 of FIG. 7A. The top roller holder 20 includes two roller arms 72 extending as one piece outward and downward from a middle section 74. The middle section 74 meets each roller arm 72 at a rounded corner with a radius of 4.83 mm. The middle section 74 is rectangular, with a length of 66.55 mm and a width of 19.30 mm. The middle section 74 includes two oblong mounting holes 76 aligned along the length of the middle section 74. The mounting holes 76 are rectangles with rounded ends, where the ends have a radius of 2.63 mm and are spaced 15.75 mm on center, with one end 3.98 mm from an edge of the roller arms 72 and the other end 3.98 mm from one of the long ends of the middle section 74.

FIG. 13B is a front schematic diagram of the top roller holder 20 of FIG. 13A (with the top roller holder 20 flipped vertically). An overall width of the top roller holder 20 is 50.80 mm. Each roller arm 72 extends downward (shown upward in FIG. 13B) from the middle section 74 with an inner radius of 11.18 mm and outer radius of 9.65 mm at the joint such that the top roller holder 20 is U-shaped with the middle section 74 being the bottom of the U. The support pillar 50 may be disposed between the two roller arms 72. The support pillar 50 extends from the middle section 74 toward the top roller 22 (not shown in FIG. 13B), and provides support and resilience against deformation of the top roller 22 as a load is applied to the RMMBA 10. A width of the support pillar 50 is 22.94 mm.

FIG. 13C is a cross-sectional diagram taken along line A-A of the top roller holder 20 of FIG. 13B. An end of the support pillar 50 which comes in contact with the top roller 22 is rounded, with a radius of 5.74 mm. At its highest, the support pillar 50 extends 30.21 mm from a bottom surface (shown in FIG. 13C as a top surface) of the middle section 74.

FIG. 13D is a side schematic diagram of the top roller holder 20 of FIG. 13A. The roller arms 72 accommodate the top roller 22 at rounded ends having a radius of 10.67 mm, at a height of 34.0 mm from the bottom surface (shown in FIG. 13D as a top surface) of the middle section 74. The middle section 74 has a height of 6.35 mm.

FIG. 14A is a front schematic diagram of the top roller 22 of the RMMBA 10 of FIG. 7A. The top roller 22 is cylindrical in shape, with a thicker inner section 78 which contacts the test specimen 36 and thinner outer sections 80 which are inserted into the top roller holder 20. The inner section 78 is 36.58 mm wide, and each of the outer sections 80 is 7.11 mm wide.

FIG. 14B is a side schematic diagram of the top roller 22 of FIG. 14A. A diameter of the outer sections 80 is 6.35 mm and a diameter of the inner section 78 is 11.40 mm.

FIG. 15A is a top schematic diagram of the bottom roller holder 24 of the RMMBA 10 of FIG. 7A. The bottom roller holder 24 includes two roller arms 82 extending as one piece outward and upward from a middle section 84. The middle section 84 meets each roller arm 82 at a rounded corner with a radius of 4.83 mm. The middle section 84 is rectangular, with a length of 66.55 mm and a width of 19.30 mm. The middle section 84 includes two oblong mounting holes 86 aligned along the length of the middle section 84. The mounting holes 86 are rectangles with rounded ends, where the ends have a radius of 2.63 mm and are spaced 15.75 mm on center, with one end 3.98 mm from an edge of the roller arms 82 and the other end 3.98 mm from one of the long ends of the middle section 84.

FIG. 15B is a front schematic diagram of the bottom roller holder 24 of FIG. 15A. An overall width of the bottom roller holder 24 is 50.80 mm. Each roller arm 82 extends upward from the middle section 84 with an inner radius of 11.18 mm and outer radius of 9.65 mm at the joint such that the bottom roller holder 24 is U-shaped with the middle section 84 being the bottom of the U.

FIG. 15C is a side schematic diagram of the bottom roller holder 24 of FIG. 15A. The roller arms 82 accommodate the bottom roller 26 at rounded ends having a radius of 10.67 mm, at a height of 34.93 mm from a top surface of the middle section 84. The middle section 84 has a height of 6.35 mm.

FIG. 16A is a front schematic diagram of the bottom roller 26 of the RMMBA 10 of FIG. 7A. The bottom roller 26 is cylindrical in shape, with a thicker inner section 88 which contacts the test specimen 36 and thinner outer sections 90 which are inserted into the bottom roller holder 24. The inner section 88 is 36.58 mm wide, and each of the outer sections 90 is 7.11 mm wide.

FIG. 16B is a side schematic diagram of the bottom roller 26 of FIG. 16A. A diameter of the outer sections 90 is 6.35 mm and a diameter of the inner section 88 is 9.53 mm.

Figure 17A:
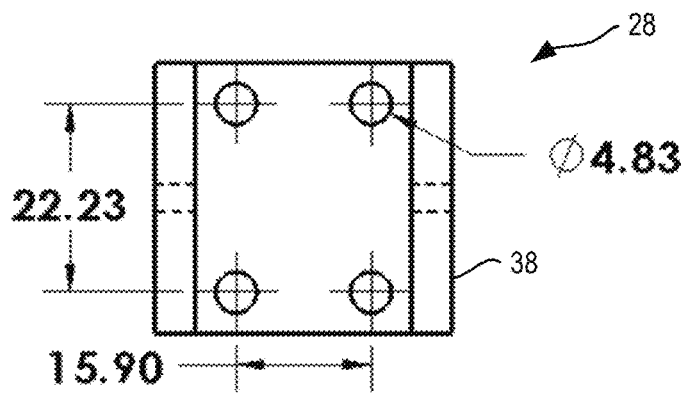
FIG. 17A is a top schematic diagram of a clamp portion of the top hinge and bottom hinge of the RMMBA of FIG. 7A.
Figures 17B, 17C:
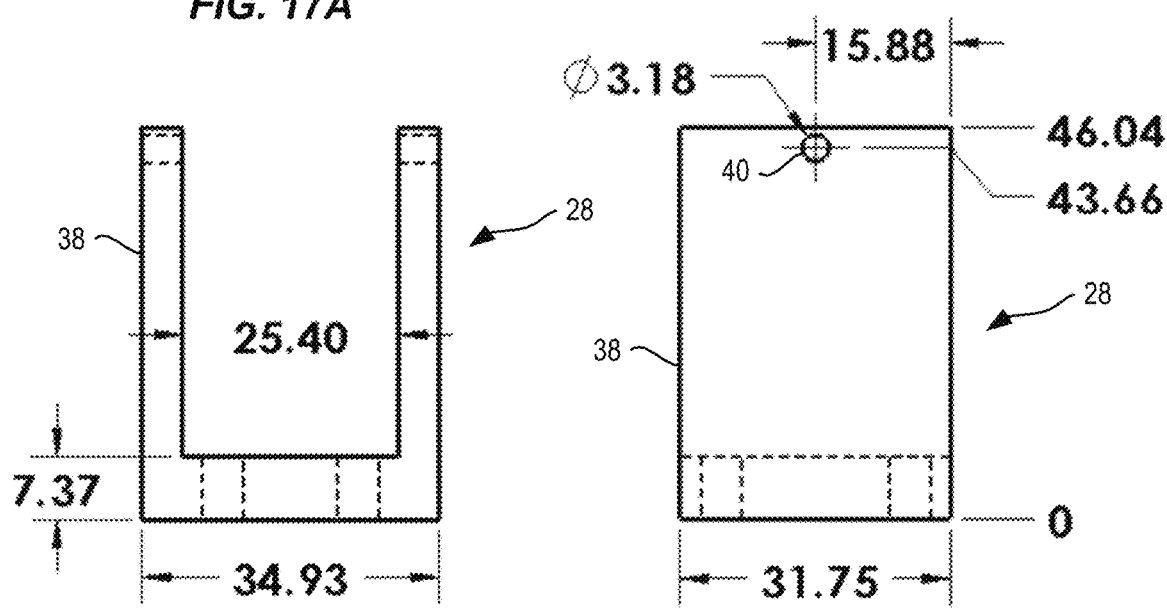
FIG. 17B is a front schematic diagram of the clamp portion of FIG. 17A.
FIG. 17C is a side schematic diagram of the clamp portion of FIG. 17A.

FIG. 17A is a top schematic diagram of the hinge clamp 38 of the top hinge 28 of the RMMBA 10 of FIG. 7A. Although the hinge is labeled as top hinge 28, the same principles apply to the bottom hinge 30, and the hinge in FIGS. 17A-17C represents bottom hinge 30 as well. The hinge clamp 38 has a base with four mounting holes in pairs spaced symmetrically on center 22.23 mm apart, with each hole having a diameter of 4.83 mm and being spaced 15.90 mm from its pair.

FIG. 17B is a front schematic diagram of the hinge clamp 38 of FIG. 17A. The hinge clamp 38 is U-shaped, with the base being 34.93 mm wide and 7.37 mm high. An inner width between arms of the hinge clamp 38 is 25.40 mm.

FIG. 17C is a side schematic diagram of the hinge clamp 38 of FIG. 17A. The base of the hinge clamp 38 is 31.75 mm long. An overall height of the hinge clamp 38 is 46.04 mm. The hinge pin 40 has a diameter of 3.18 mm and is spaced 43.66 mm from the base of the hinge clamp 38 and 15.88 mm from edges of the arms (e.g., centered on the arms).

Figure 18A:
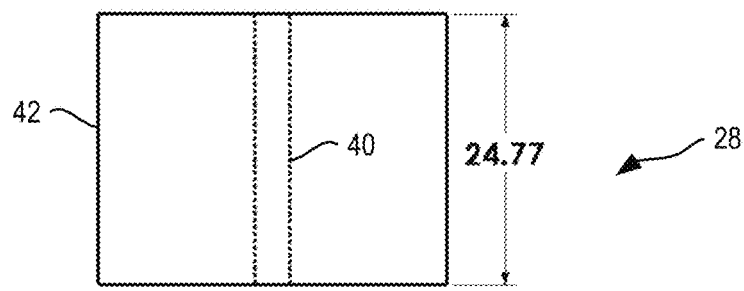
FIG. 18A is a top schematic diagram of a tab portion of the top hinge and bottom hinge of the RMMBA of FIG. 7A.
Figure 18B:
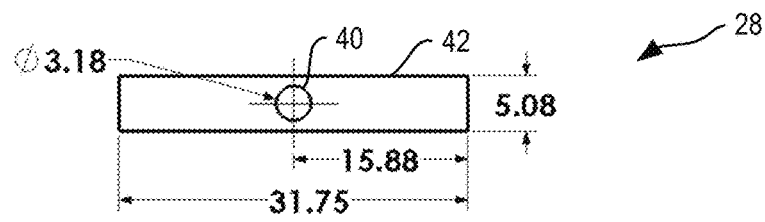
FIG. 18B is a front schematic diagram of the tab portion of FIG. 18A.

FIG. 18A is a top schematic diagram of the hinge tab 42 of the top hinge 28 of the RMMBA 10 of FIG. 7A. Although the hinge is labeled as top hinge 28, the same principles apply to the bottom hinge 30, and the hinge in FIGS. 18A-18B represents bottom hinge 30 as well. The hinge tab 42 has a width of 24.77 mm.

FIG. 18B is a front schematic diagram of the hinge tab 42 of FIG. 18A. The hinge tab 42 further has a length of 31.75 mm, with a thickness of 5.08 mm and the hinge pin 40 positioned 15.88 mm from edges of the hinge tab 42. With reference to FIGS. 17C, 18A, and 18B, the hinge pin 40 is inserted through the hinge tab 42 and at least partially through the hinge clamp 38 to hold the hinge tab 42 in place.

FIG. 19A is a top schematic diagram of the base 32 of the RMMBA 10 of FIG. 7A. The base 32 is 63.50 mm wide and 254.00 mm long. A top surface of the base 32 includes seven holes for mounting the bottom roller holder 24, each of which is aligned along a centerline of its width. The seven holes are positioned at 89.03 mm, 101.73 mm, 114.43 mm, 127.13 mm, 139.83 mm, 152.53 mm, and 165.23 mm on center from one end of the base 32. Two pairs of mounting holes for the bottom hinge 30 are spaced 23.80 mm and 39.70 mm from one side of the base 32. The first pair of holes is positioned at 217.55 mm on center from the one end of the base 32, and the second pair of holes is positioned at 239.78 mm. Each of the seven holes and two pairs of holes has a 4.83 mm diameter and 12.7 mm depth.

FIG. 19B is a front schematic diagram of the base 32 of FIG. 19A. A bottom surface of the base 32 (shown on the right in FIG. 19B) defines a channel with an undercut groove. The opening of the channel at the bottom surface extends from 23.81 mm to 39.69 mm from the one side of the base 32. The groove of the channel extends from 19.56 mm to 43.94 mm from the one side of the base 32. The groove of the channel further extends from 14.29 mm to 23.81 mm from the top surface of the base 32. The base 32 has a height of 31.75 mm.

FIG. 20A is a bottom schematic diagram of the base slider 34 of the RMMBA 10 of FIG. 7A. The base slider 34 includes a body and tongues extending therefrom for fitting into the groove of the base 32. The base slider 34 has an overall width of 22.00 mm and a length of 28.50 mm. The body of the base slider 34 includes an opening which is 11.01 mm in diameter.

FIG. 20B is a front schematic diagram of the base slider 34 of FIG. 20A. The body of the base slider 34 has a width of 14.00 mm and an overall height of 16.00 mm. Each tongue extends 4.00 mm from the body with a height of 8.50 mm.

IV. Example RMMBA with Parametric Dimensions

FIGS. 21A-25B illustrate the components of the RMMBA 10 with exemplary variable primary and dependent parameters. The primary parameters are indicated in Table 3, along with a range of distances. Dependent parameters vary according to a relationship with the primary parameters, as indicated in Table 4.

TABLE 3

| Primary Parameters | |
| --- | --- |
| Primary Parameters | Range (mm) |
| A | 10-11 |
| B | 18.5-19.5 |
| C | 60-63 |
| D | 11.0-11.5 |
| E | 25-26 |
| F | 12.5-13.5 |
| G | 22.5-23.5 |

TABLE 4

| Dependent Parameters | |
| --- | --- |
| Dependent Parameters | Relationship |
| W | W = 39.695 − 0.5D |
| X | X = 1.007D |
| Y | Y = 0.44E |
| Z | Z = 62.2 + 2A |

FIG. 21A is a front schematic diagram of the yoke 14, similar to FIG. 10A, with variable parameters indicated.

FIG. 21B is a side schematic diagram of the yoke 14, similar to FIG. 10B, with variable parameters indicated. The variable parameters of the yoke 14 are as indicated: the bottom length C, the overall width E, the thickness Y of the angled yoke arms 54, and the space Z between the bottom portions 62.

Figure 22C:
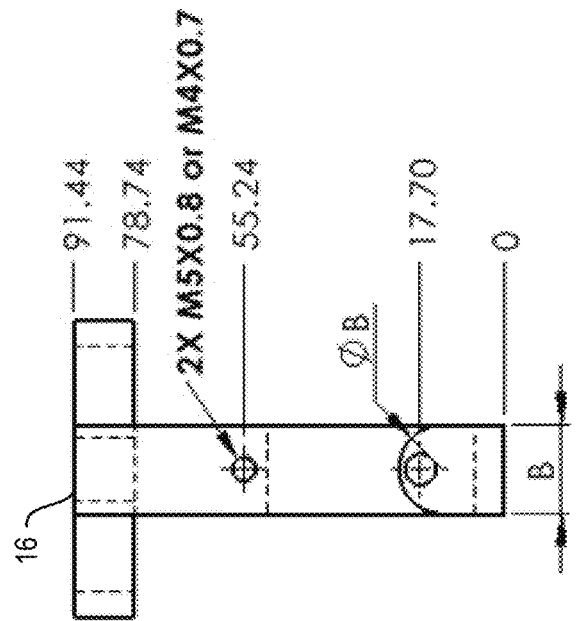
FIG. 22C is a side schematic diagram of the saddle, similar to FIG. 11C, with variable parameters indicated.
Figure 22A:
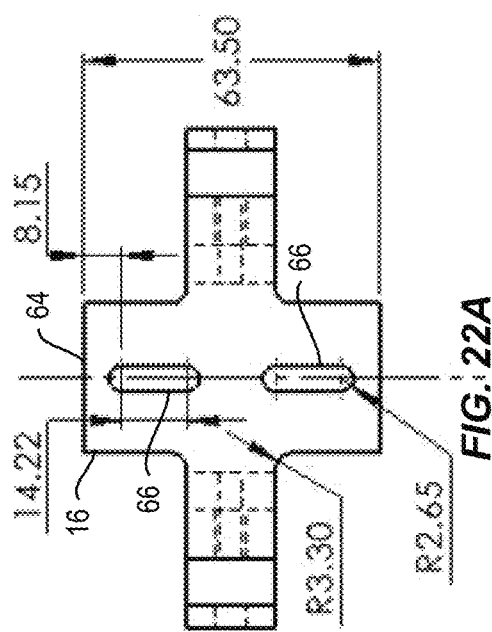
FIG. 22A is a top schematic diagram of the saddle, similar to FIG. 11A, with variable parameters indicated.
Figure 22B:
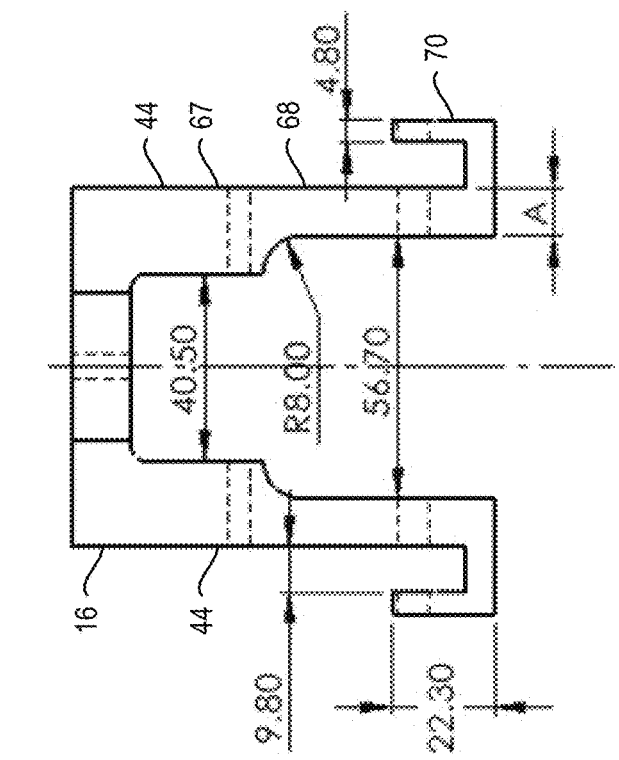
FIG. 22B is a front schematic diagram of the saddle, similar to FIG. 11B, with variable parameters indicated.

FIG. 22A is a top schematic diagram of the saddle 16, similar to FIG. 11A, with variable parameters indicated. FIG. 22B is a front schematic diagram of the saddle 16, similar to FIG. 11B, with variable parameters indicated. FIG. 22C is a side schematic diagram of the saddle 16, similar to FIG. 11C, with variable parameters indicated. The variable parameters of the saddle 16 are as indicated: a width A of each lower section 68 and a width B of each saddle leg 44.

FIG. 23A is a top schematic diagram of the lever 18, similar to FIG. 12A, with variable parameters indicated. FIG. 23B is a side schematic diagram of the lever 18, similar to FIG. 12B, with variable parameters indicated. FIG. 23C is a front schematic diagram of the lever 18, similar to FIG. 12C, with variable parameters indicated. The variable parameters of the lever 18 are as indicated: the bevels of the lever 18 begin at F from the bottom surface.

Figure 24A:
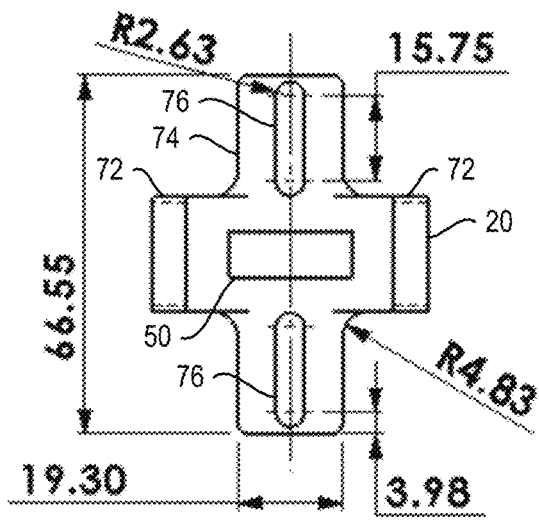
FIG. 24A is a bottom schematic diagram of the top roller holder, similar to FIG. 13A, with variable parameters indicated.
Figure 24C:
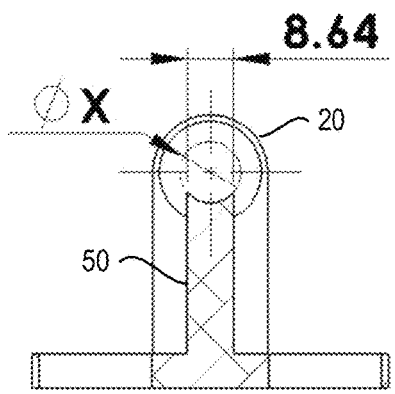
FIG. 24C is a cross-sectional diagram taken along line A-A of the top roller holder, similar to FIG. 13C, with variable parameters indicated.
Figure 24B:
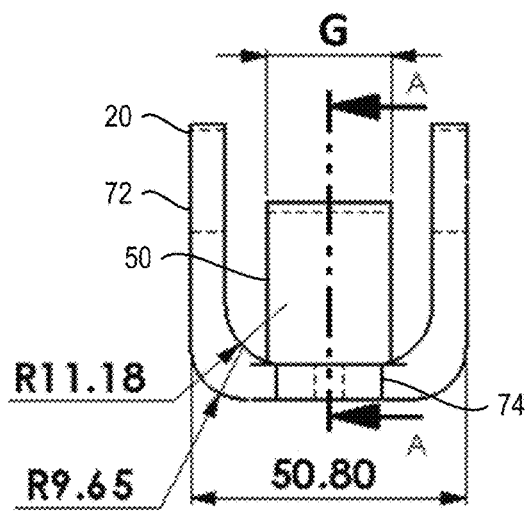
FIG. 24B is a front schematic diagram of the top roller holder, similar to FIG. 13B, with variable parameters indicated.
Figure 24D:
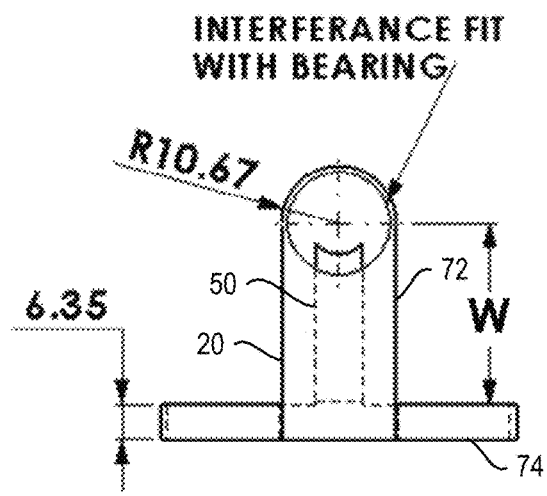
FIG. 24D is a side schematic diagram of the top roller holder, similar to FIG. 13D, with variable parameters indicated.

FIG. 24A is a bottom schematic diagram of the top roller holder 20, similar to FIG. 13A, with variable parameters indicated. FIG. 24B is a front schematic diagram of the top roller holder 20, similar to FIG. 13B, with variable parameters indicated. FIG. 24C is a cross-sectional diagram taken along line A-A of the top roller holder 20, similar to FIG. 13C, with variable parameters indicated. FIG. 24D is a side schematic diagram of the top roller holder 20, similar to FIG. 13D, with variable parameters indicated. The variable parameters of the top roller holder 20 are as indicated: a width G of the support pillar 50, a height W of the top roller 22 from the bottom surface of the middle section 74 and a radius X of an end of the support pillar 50 which comes in contact with the top roller 22.

Figure 25A:
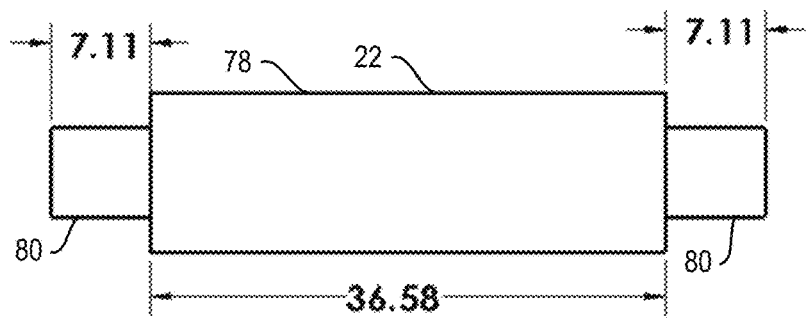
FIG. 25A is a front schematic diagram of the top roller, similar to FIG. 14A, with variable parameters indicated.
Figure 25B:
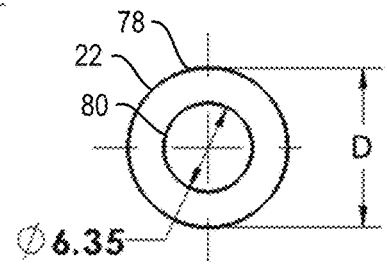
FIG. 25B is a side schematic diagram of the top roller, similar to FIG. 14B, with variable parameters indicated.

FIG. 25A is a front schematic diagram of the top roller 22, similar to FIG. 14A, with variable parameters indicated. FIG. 25B is a side schematic diagram of the top roller 22, similar to FIG. 14B, with variable parameters indicated. The variable parameters of the top roller 22 are as indicated: a diameter D of the inner section 78.

Those skilled in the art will recognize improvements and modifications to the preferred embodiments of the present disclosure. All such improvements and modifications are considered within the scope of the concepts disclosed herein and the claims that follow.

What is claimed is:

1. A reinforced mixed-mode bending apparatus (RMMBA) for testing fracture and characterizing delamination in layered materials, the RMMBA comprising:
   a lever;
   a saddle disposed above a top surface of the lever and adjacent to two lateral sides of the lever, wherein the saddle is laterally fixed to the lever;
   a top roller holder disposed below and coupled to the lever, the top roller holder holding a top roller, wherein the top roller holder comprises a support pillar in contact with and reinforcing the top roller; and
   a yoke disposed over the saddle and configured to transfer an applied load to the top roller via the saddle, the lever, and the top roller holder, wherein the top roller is configured to transfer the applied load to a specimen being tested with the RMMBA.

2. The RMMBA of claim 1, wherein the saddle comprises saddle legs, each saddle leg disposed adjacent to one of the two lateral sides of the lever.

3. The RMMBA of claim 2, further comprising a plurality of fasteners, wherein each fastener extends from one of the saddle legs to the lever to laterally fix the saddle to the lever.

4. The RMMBA of claim 3, wherein each fastener comprises a bolt extending through one of the saddle legs and threaded into the lever.

5. The RMMBA of claim 1, wherein the support pillar reduces deformation of the top roller under the applied load.

6. The RMMBA of claim 1, wherein the yoke comprises a top member disposed between angled yoke arms.

7. The RMMBA of claim 1, further comprising:
   a bottom roller holder coupled to a base and holding a bottom roller configured to support a bottom surface of the specimen;
   a top hinge disposed below and coupled to an end of the lever; and
   a bottom hinge coupled to the base, wherein the top hinge and the bottom hinge are configured to accommodate the specimen therebetween.

8. A reinforced mixed-mode bending apparatus (RMMBA) for testing fracture and characterizing delamination in layered materials, the RMMBA comprising:
   a lever;
   a saddle disposed above a top surface of the lever and adjacent to two lateral sides of the lever;
   a top roller holder disposed below and coupled to the lever, the top roller holder comprising a middle section and two roller arms extending from the middle section, the top roller holder holding a top roller, wherein the top roller holder comprises a support pillar disposed between the two roller arms, the support pillar in contact with and reinforcing the top roller; and
   a yoke disposed over the saddle and configured to transfer an applied load to the top roller via the saddle, the lever, and the top roller holder, wherein the top roller is configured to transfer the applied load to a specimen being tested with the RMMBA.

9. The RMMBA of claim 8, wherein the support pillar reduces deformation of the top roller under the applied load.

10. The RMMBA of claim 8, wherein the middle section and the two roller arms of the top roller holder form a U shape.

11. The RMMBA of claim 10, wherein the support pillar extends from the middle section to contact the top roller.

12. The RMMBA of claim 10, wherein an end of the support pillar which contacts the top roller is rounded to accommodate the top roller.

13. The RMMBA of claim 8, wherein the saddle is laterally fixed to the lever.

14. The RMMBA of claim 13, wherein the yoke comprises a top member disposed between angled yoke arms.

15. A reinforced mixed-mode bending apparatus (RMMBA) for testing fracture and characterizing delamination in layered material, the RMMBA comprising:
   a lever, wherein the lever is an I-beam lever having a bottom flange which is thicker than a top flange;
   a saddle disposed above a top surface of the lever and adjacent to two lateral sides of the lever;
   a top roller holder disposed below and coupled to the lever, the top roller holder holding a top roller; and
   a yoke disposed over the saddle and comprising a top member disposed between angled yoke arms, wherein the angled yoke arms are angled to reinforce the yoke, wherein the yoke is configured to transfer an applied load to a top roller via the saddle, the lever, and the top roller holder, and wherein the top roller is configured to transfer the applied load to a specimen being tested with the RMMBA.

16. The RMMBA of claim 15, wherein each of the angled yoke arms comprise a low portion perpendicular to the top member and an angled upper portion.

17. The RMMBA of claim 15, wherein:
the top roller holder comprises a support pillar in contact with and reinforcing the top roller; and
the saddle is laterally fixed to the lever.

18. A reinforced mixed-mode bending apparatus (RMMBA) for testing fracture and characterizing delamination in layered materials, the RMMBA comprising:
a lever;
a saddle disposed above a top surface of the lever and adjacent to two lateral sides of the lever, wherein the saddle is laterally fixed to the lever, and wherein the saddle comprises saddle legs, each saddle leg disposed adjacent to one of the two lateral sides of the lever;
a plurality of fasteners, wherein each fastener extends from one of the saddle legs to the lever to laterally fix the saddle to the lever;
a top roller holder disposed below and coupled to the lever, the top roller holder holding a top roller; and
a yoke disposed over the saddle and configured to transfer an applied load to the top roller via the saddle, the lever, and the top roller holder, wherein the top roller is configured to transfer the applied load to a specimen being tested with the RMMBA.

19. The RMMBA of claim 18, wherein the yoke comprises a top member disposed between angled yoke arms.

20. A reinforced mixed-mode bending apparatus (RMMBA) for testing fracture and characterizing delamination in layered material, the RMMBA comprising:
a lever;
a saddle disposed above a top surface of the lever and adjacent to two lateral sides of the lever, wherein the saddle is laterally fixed to the lever;
a top roller holder disposed below and coupled to the lever, the top roller holder holding a top roller, wherein the top roller holder comprises a support pillar in contact with and reinforcing the top roller; and
a yoke disposed over the saddle and comprising a top member disposed between angled yoke arms, wherein the angled yoke arms are angled to reinforce the yoke, wherein the yoke is configured to transfer an applied load to a top roller via the saddle, the lever, and the top roller holder, and wherein the top roller is configured to transfer the applied load to a specimen being tested with the RMMBA.

* * * * *